(12) United States Patent
Koba et al.

(10) Patent No.: US 7,340,950 B2
(45) Date of Patent: Mar. 11, 2008

(54) FLOW RATE MEASURING DEVICE

(75) Inventors: Yasuo Koba, Kyoto (JP); Hirozumi Nakamura, Nara (JP); Takuhisa Ootani, Nara (JP); Kazunori Ueyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/574,896

(22) PCT Filed: Sep. 29, 2005

(86) PCT No.: PCT/JP2005/017985

§ 371 (c)(1),
(2), (4) Date: Mar. 8, 2007

(87) PCT Pub. No.: WO2006/035888

PCT Pub. Date: Apr. 6, 2006

(65) Prior Publication Data

US 2007/0272031 A1    Nov. 29, 2007

(30) Foreign Application Priority Data

Sep. 29, 2004 (JP) .............................. 2004-283472
Sep. 29, 2004 (JP) .............................. 2004-283601
Sep. 29, 2004 (JP) .............................. 2004-283602

(51) Int. Cl.
*G01F 3/24* (2006.01)

(52) U.S. Cl. ...................................... 73/217

(58) Field of Classification Search .................. 73/861, 73/861.01, 218, 217
See application file for complete search history.

(56) References Cited

U.S. PATENT DOCUMENTS 4,520,677 A * 6/1985 Macko et al. .................. 73/861
5,253,535 A * 10/1993 McCown ...................... 73/861

FOREIGN PATENT DOCUMENTS

| JP | 6-41863 | 6/1994 |
|---|---|---|
| JP | 9-15019 | 1/1997 |
| JP | 2004-93497 | 3/2004 |
| JP | 2004-184308 | 7/2004 |

* cited by examiner

*Primary Examiner*—Jewel Thompson
(74) *Attorney, Agent, or Firm*—Pearne & Gordon LLP

(57) ABSTRACT

To provide a flowmeter capable of enhancing metering resolution to thus effect accurate metering.

When a fluid to be measured is supplied to or discharged from a metering chamber 4, a membrane 11 provided in the metering chamber 4 is reciprocally actuated, and a rotation section R1 performs rotational movement in association with reciprocal movement of the membrane 11. At this time, since the rotation section R1 is provided with a magnet 5 or a direction sensor 6, the magnet 5 or the direction sensor 6 also effects rotational movement. The direction sensor 6 detects rotational movement, to thus determine a relative position between the membrane and the rotation section. Thus, the position of the membrane 11 can be detected, and metering resolution is enhanced. Thus, accurate metering can be performed.

19 Claims, 20 Drawing Sheets

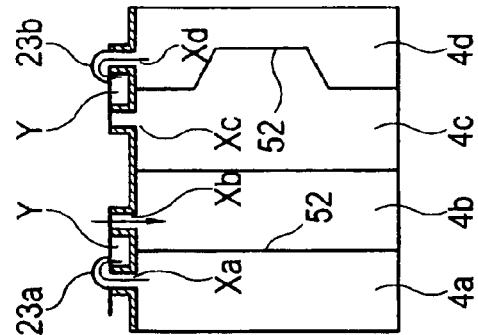
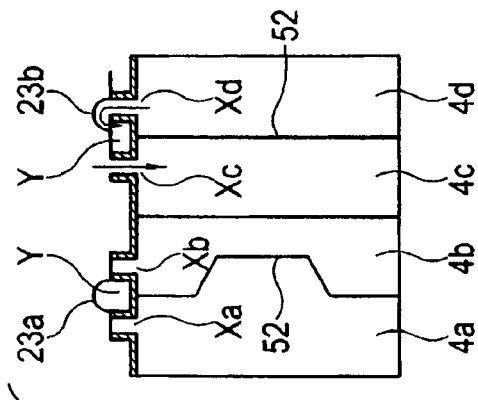
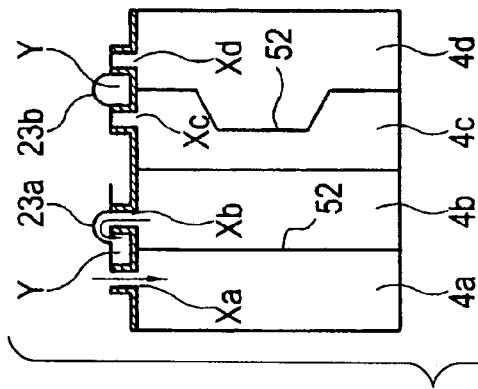
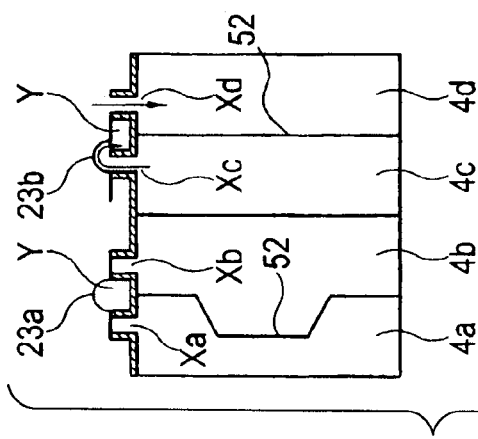

FLOW RATE MEASURING DEVICE

FIELD OF THE INVENTION

The present invention relates to a flowmeter for metering a flow rate of a fluid such as a gas, a liquid, or the like, and more particularly to a membrane-type flowmeter.

BACKGROUND ART

A membrane-type flowmeter having a membrane which effects single reciprocation in association with supply and discharge of a predetermined quantity of fluid to a metering chamber has hitherto been described as a flowmeter for metering a flow rate of a fluid such as a gas or the like (see, e.g., JP-A-2004-93497).

As shown in FIG. 20, such a flowmeter 100 is provided with a membrane section (omitted from the drawings) which effects reciprocation in response to supply and discharge of a gas into and from the metering chamber. A link mechanism 101 is joined to a wing shaft which pivots in association with the reciprocation of the membrane section. The link mechanism 101 is formed by combination of a pair of longer gate hooks 101a and a pair of shorter gate hooks 101b. A pair of magnets 103, which are symmetrical about the center, are provided along a brim of a rotary member 102. A lead switch 104, which is activated when the magnets 103 have been rotated to a specific rotational phase, is provided. Moreover, a controller 105, which determines a flow rate in accordance with a signal output from the lead switch 104 and displays the thus-determined flow rate on a display section 106, is also provided.

The rotary member 102 comprises a crank shaft 102a which is rotatably provided on a support table 107 placed in an upper portion of a casing (omitted from the drawings); and a rotary disk 102b attached to the crank shaft 102a. A crank arm 108 is attached to the crank shaft 102a. The crank arm 108 is equipped with pivotal valves 112 which open or close gas inlet ports 110 and gas outlet ports 111 by way of a pair of crank rods 109, 109.

Accordingly, the rotary disk 102b causes a single rotation when the membrane has effected a single reciprocation in response to supply and discharge of a gas to and from the metering chamber, and hence the pair of magnets 103, 103 attached to the rotary disk 102b also rotate in the same fashion. The lead switch 104 detects rotations of the magnets 103, 103 and sends signals to the controller 105, where the flow rate is computed. The thus-computed flow rate is displayed on the display section 106. The pair of pivotal valves 112 pivot in association with the rotation of the rotary disk 102b, thereby opening and closing the gas inlet ports 110 and the gas outlet ports 111 as appropriate. Thus, the gas is supplied and discharged.

DISCLOSURE OF THE INVENTION

Problem to be Solved by the Invention

Incidentally, in the previously-described flowmeter 100, the rotation of the rotary disk 112b is detected through use of the lead switch 104 that is activated when the magnets 103 have reached the specific rotational phase. The plurality of magnets 103 are used for enhancing resolution.

However, when the magnets 103 are out of the specific rotational phase, the lead switch 104 is not activated. An in-progress state cannot be detected, which poses a problem of a failure to perform accurate metering.

When the flowmeter 100 is used for a city gas system where flowmeters are piped in parallel to many households, there may be a case where a pulsing stream, resulting from flow and backflow of a gas immediately before the flowmeter 100 installed at a household where a large quantity of gas is being used, may propagate to the flowmeter 100 of another household. In such a case, when the plurality of magnets 103 are used, the magnets 103 cause reciprocation, to thus activate and deactivate the lead switch 104. Thus, counting operation is performed as if the gas were being used. Thus, there is a problem of a risk of a failure to perform accurate metering.

The above-described flowmeter inevitably requires a process for converting the reciprocal movement of the membrane into rotational movement. Resultantly, difficulty is encountered in achieving constant angular velocity of rotational movement of a rotational member, such as the rotary disk 102b, at every point along the locus of movement of the rotary member. Consequently, moving velocity of the magnets along the locus varies (non-constant velocity movement). Accordingly, even when a plurality of magnets are provided, difficulty is still encountered in achieving metering which reflects an accurate quantity of flow, as required.

However, there is recently an increasing demand for accurately metering a flow rate in real time. Specifically, there is sought metering accuracy and resolution which enable accurate monitoring of variations in flow rate per cycle.

The present invention aims at providing a flowmeter capable of performing accurate metering while enhancing metering resolution.

Means for Solving the Problem

A flowmeter of the present invention comprises a main body, a membrane section which is fixed to the main body and defines a metering chamber used for housing and discharging a fluid, a rotation section which performs rotational movement in synchronism with reciprocal movement of the membrane section, a member to be detected which is placed on one of the main body and the rotation section, a direction sensor which is placed on another one of the main body and the rotation section and detects location of the member to be detected and movement thereof caused in association with rotational movement of the rotation section, and a flow rate computing section which detects the position of the member to be detected by means of a detection signal output from the direction sensor and which computes a flow rate of the fluid.

The "rotational movement" signifies unidirectional movement along a closed curve as well as such movement along a perfect circle, an oval, a flat oval, or the like. By means of this configuration, when a fluid to be measured is supplied to or discharged from the metering chamber, the membrane provided in the metering chamber is reciprocally actuated, and the rotation section is rotationally moved in association with reciprocal movement of the membrane. At this time, since a magnet or a direction sensor is provided on the rotation section, the magnet or the direction sensor also effects rotational movement. The direction sensor detects the rotational movement, to thus determine a relative position between the membrane and the rotation section. Thus, the position of the membrane can be detected. Accordingly, metering resolution is enhanced, so that accurate metering can be performed.

In relation to the above description, the flowmeter can be configured such that the member to be detected is placed on the rotation section, and the direction sensor is placed at the center of rotational movement of the member to be detected.

By means of this configuration, the position of the direction sensor is fixed with respect to the member to be detected. Hence, the direction sensor can accurately detect the relative position of the member to be detected which rotates around the direction sensor, and can perform accurate metering on the basis of the thus-detected relative position.

The member to be detected is formed from a magnet, and the direction sensor can be formed from a magnetic direction sensor. In this case, the magnet can be configured so as to rotate while directing a single pole thereof toward the magnetic direction sensor at all times.

By means of this configuration, the orientation of the magnetic flux changes while the magnetic direction sensor is taken as a center. When the magnet has rotated once, the direction of the magnet and variations are also rotated, and hence coordinates of the magnet that rotates around the position of the magnetic direction sensor can be clearly detected.

Moreover, a flowmeter of the present invention comprises a main body, a membrane section which is fixed to the main body and defines a metering chamber used for housing and discharging a fluid, a movement conversion section for converting reciprocal movement of the membrane section into rotational movement, a member to be detected which is fixed to one of the main body and a mechanism section formed from the membrane section and the movement conversion section, a direction sensor which is fixed to another one of the main body and the mechanism section and which detects a position relative to the member to be detected, and a flow rate computing section which detects the position of the member to be detected by means of a detection signal output from the direction sensor and which computes a flow rate of the fluid.

By means of this configuration, any one of the magnet and the direction sensor is provided on the main body, and a remaining one is provided on the mechanism section formed from a membrane and a movement conversion section for converting reciprocal movement of the membrane into rotational movement. Movement of the fluid can be directly detected. Thereby, metering resolution is enhanced, and accurate metering can be performed.

One of the member to be detected and the direction sensor can be fixed to the membrane section.

By means of this configuration, one of the member to be detected and the direction sensor is provided on the membrane section that is directly affected by movement of a fluid. Accordingly, the accuracy of metering of a flow rate can be enhanced.

The member to be detected is formed from a magnet and can be fixed to the membrane section. In this case, the direction sensor is formed from a magnetic direction sensor.

When the direction sensor is provided on the membrane section, wiring is required, thereby rendering the structure of the flowmeter complex. However, by means of the present configuration, a magnet which does not require wiring is fixed to the membrane section, and hence the structure is made simple.

A flowmeter of the present invention comprises a main body, a membrane section which is fixed to the main body and defines a metering chamber used for housing and discharging a fluid, a rotary member which performs rotational movement in synchronism with reciprocal movement of the membrane section, a member to be detected which is placed on the rotary member, a direction sensor which detects location of the member to be detected and movement thereof caused in association with rotational movement of the rotary member, a weighting coefficient computing section which detects variations in rotation of the rotary member from a detection signal output from the direction sensor and which computes an angular velocity achieved at an arbitrary position along a circumferential direction of the rotary member and a weighting coefficient in response to the angular velocity, and a flow rate computing section which detects the position of the member to be detected by means of a detection signal output from the direction sensor and which computes a flow rate of the fluid achieved at the arbitrary position by reference to the position of the member to be detected and the weighting coefficient.

By means of this configuration, variations in the rotation of the rotary member can be detected by use of the thus-obtained weighting coefficient. Hence, an accurate momentary flow rate can be monitored at all times.

In the above description, the weighting coefficient computing section can be configured so as to measure a time required for one rotation of the rotary member at a plurality of reference points along a rotational direction of the rotary member by reference to the detection signal output from the direction sensor, detect an angular velocity at the respective positions along the rotational direction of the rotary member, and compute, in a predetermined area along the rotational direction of the rotary member where the measured times fall within a range of the predetermined difference, weighting coefficients for the positions, where the angular velocities have been detected, by reference to a reference time determined from the times falling within the range of the predetermined difference as well as to the angular velocities.

By means of this configuration, a flow rate achieved at a predetermined position along the rotational direction is computed by use of the thus-obtained weighting coefficients, and a flow rate in a momentary direction is also grasped. Accordingly, an accurate momentary flow rate can be monitored at all times, and an anomalous increase in flow rate can be addressed more quickly.

The weighting coefficient computing section can be configured so as to measure a time required for one rotation of the rotary member at a plurality of reference points in a rotational direction of the rotary member by reference to a detection signal output from the direction sensor, detect an angular velocity at the respective reference points of the rotary member, and impart a weighting coefficient computed by reference to the time and the angular velocity, in a predetermined area along the rotational direction of the rotary member from the respective reference points.

By means of this configuration, the amount of computation can be diminished further, and the burden imposed on the weighting coefficient computing section and that imposed on the flow rate computing section are diminished, thereby enabling cost cutting.

Another flowmeter of the present invention comprises a main body, a membrane section which is fixed to the main body and defines a metering chamber used for housing and discharging a fluid, a rotary member which performs rotational movement in synchronism with reciprocal movement of the membrane section, a member to be detected which is placed on the rotary member, a direction sensor which detects location of the member to be detected and movement thereof caused in association with rotational movement of the rotary member, and a flow rate computing section which detects from the direction sensor from the direction sensor variations in rotation of the rotary member and the position of the member to be detected and which computes a flow rate of the fluid, wherein the flow rate computing section measures a time required for one rotation of the rotary member at a plurality of positions in the rotational direction of the rotary member and computes a flow rate at each of the positions on the basis of the most-recently measured time.

By means of this configuration, the amount of computation can be diminished further, and the burden imposed on the weighting coefficient computing section and that imposed on the flow rate computing section are diminished, thereby enabling cost cutting.

In the above flowmeter, the direction sensor is preferably placed essentially at the center rotational axis of the rotary member. Moreover, the member to be detected is preferably placed at a position along an outer brim of the rotary member, and a distance between the direction sensor and the member to be detected is preferably substantially equal over the rotational direction of the rotary member. The member to be detected can also be formed from a magnet, and the direction sensor can also be formed from a magnetic direction sensor.

By means of the above configuration, a simple, low-cost flowmeter can be provided.

Moreover, another flowmeter of the present invention comprises a main body, a membrane section which is fixed to the main body and defines a metering chamber used for housing and discharging a fluid, a rotary member which performs rotational movement in synchronism with reciprocal movement of the membrane section, a magnet placed on the rotary member, a plurality of lead switches for detecting movement of the magnet associated with rotational movement of the rotary member, and a flow rate computing section which detects variations in rotation of the rotary member and the position of the magnet by means of a detection signal output from the plurality of lead switches and which computes a flow rate of the fluid. The flow rate computing section measures, at each of the positions of a plurality of lead switches, a time required for one rotation of the rotary member and computes a flow rate on the basis of the most-recently measured time. In this flowmeter, the magnet is preferably placed at a position along an outer brim of the rotary member, and the plurality of lead switches are preferably placed in the vicinity of the outer brim.

In the above configuration, a combination of a magnet and a lead switch, which have been used widely thus far, can be used.

Advantages of the Invention

According to the flowmeter of the present invention, resolution for metering a flow rate of a fluid is enhanced, and accurate metering can be performed.

The flowmeter of the present invention uses a member to be detected and a direction sensor. A relative position between the member to be detected and a direction sensor is determined, to thereby measure the flow rate of a fluid. Consequently, metering resolution is enhanced, and accurate metering can be performed.

When the member to be detected performs rotational movement, variations in the speed of rotational movement are detected, thereby enhancing the resolution of metering of a flow rate and metering accuracy.

BRIEF DESCRIPTION OF THE DRAWINGS

FIG. 16. A descriptive view showing control of supply and discharge of a gas to and from each of metering chambers.

DESCRIPTIONS OF THE REFERENCE NUMERALS

4 METERING CHAMBER
5, 5b MAGNETS
6, 6b DIRECTION SENSORS
6A, 6B, 6C, 6D LEAD SWITCHES
7 CONTROLLER
11 MEMBRANE
C, 50 CASING (MAIN BODY)
51 VALVE SECTION
52 MEMBRANE SECTION
53 LINK MECHANISM
54 ROTARY MEMBER
100 MEMBRANE-TYPE GAS METER (FLOWMETER)

M0 MECHANISM SECTION
M1 MOVEMENT CONVERSION SECTION

BEST MODES FOR IMPLEMENTING THE INVENTION

Embodiments of a flowmeter of the present invention will be described hereinbelow by reference to the drawings.

First Embodiment

Figure 1:
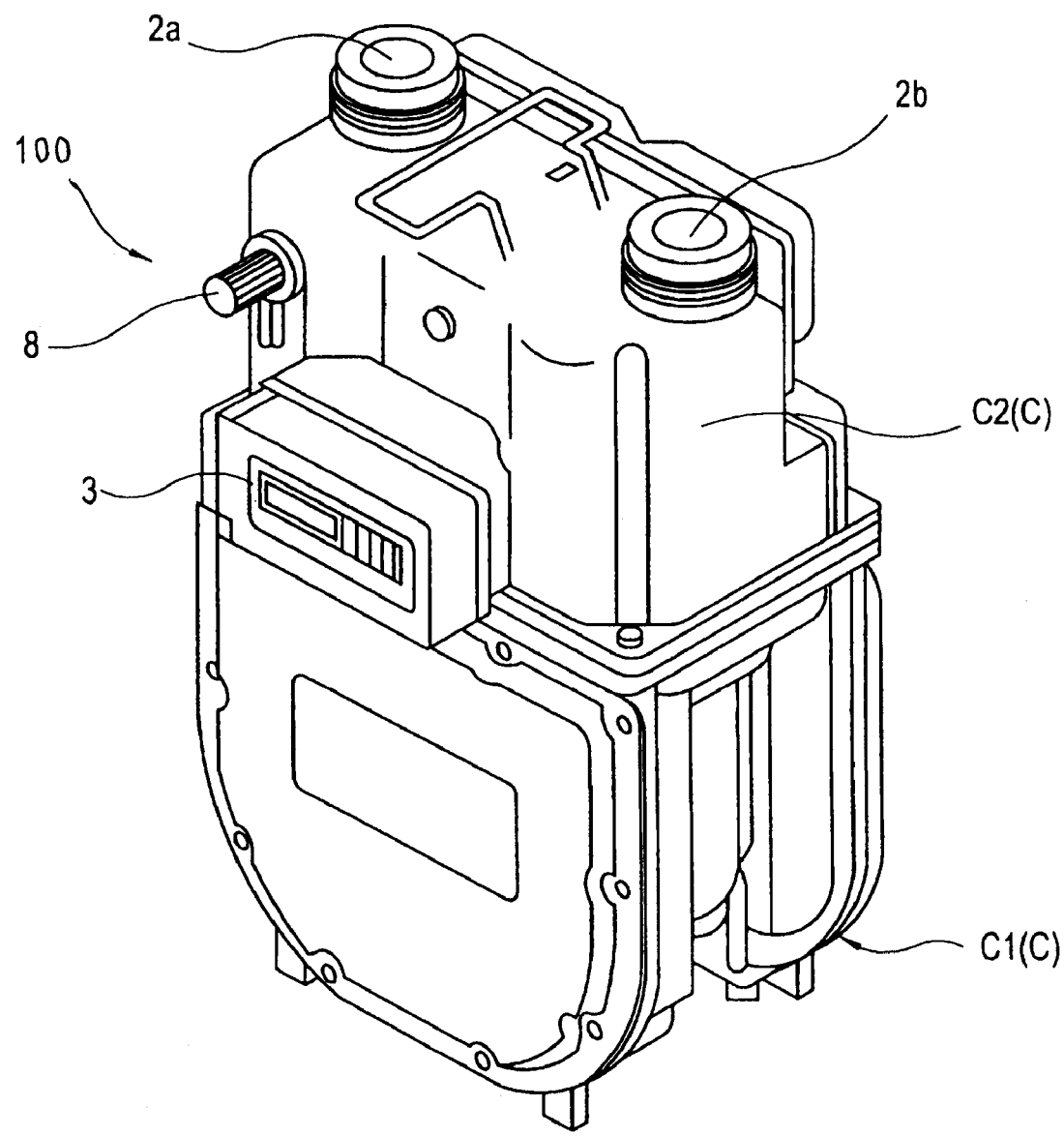
FIG. 1. A perspective view showing the entire membrane-type gas meter which is a flowmeter of a first embodiment.
Figure 2:
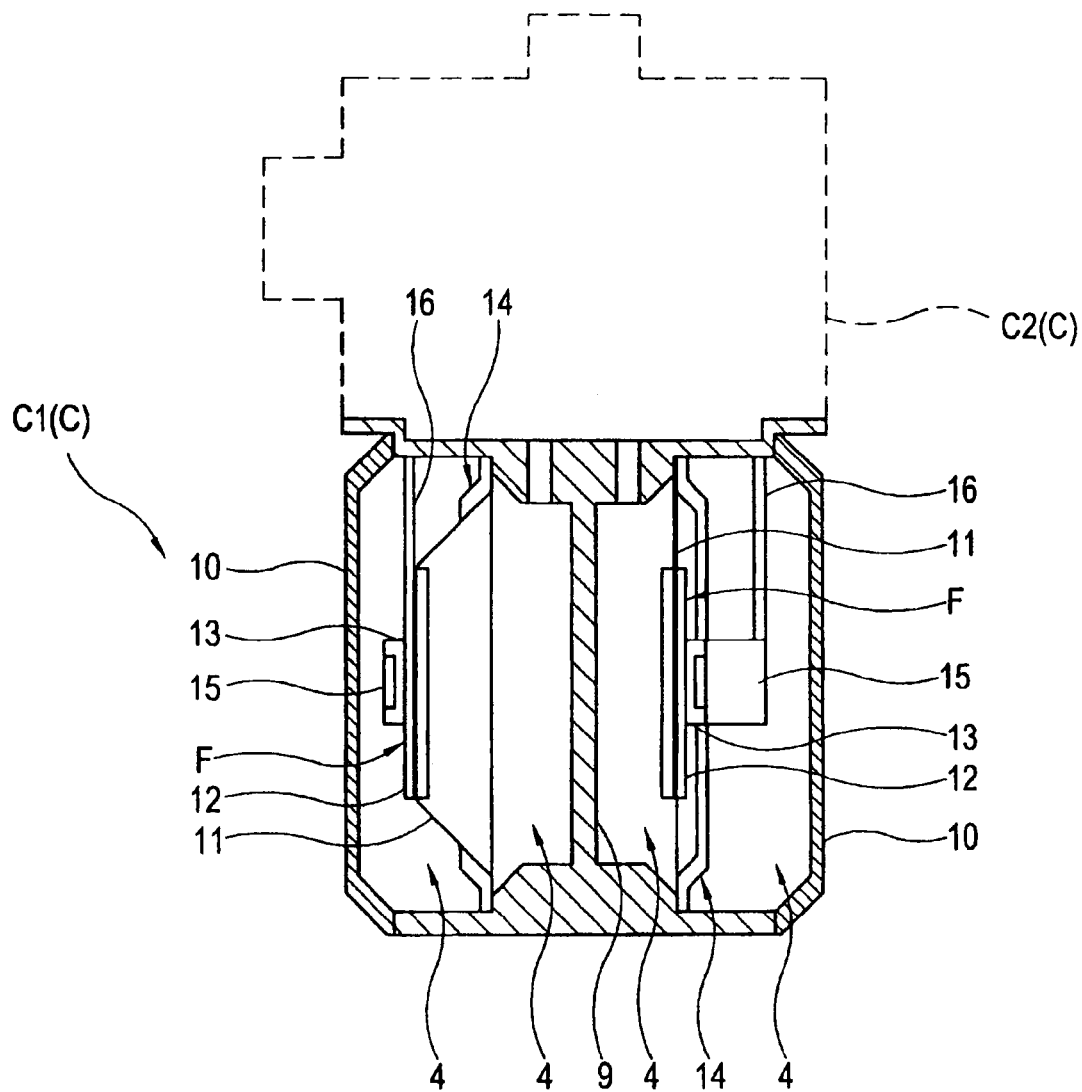
FIG. 2. A longitudinal cross-sectional view showing a characteristic section of the membrane-type gas meter of the first embodiment.
Figure 3:
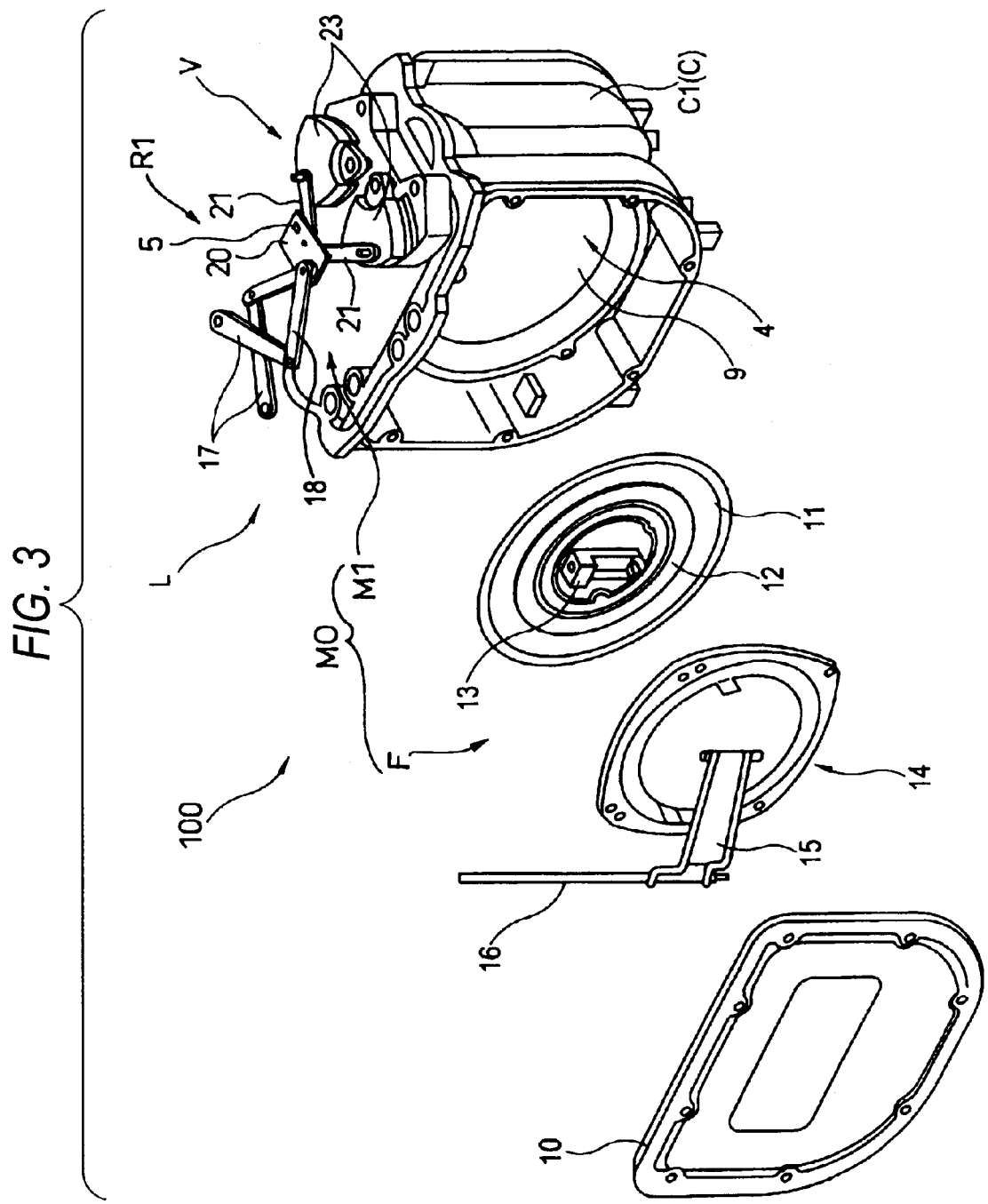
FIG. 3. An exploded perspective view showing the characteristic section of the membrane-type gas meter of the first embodiment.
Figure 4:
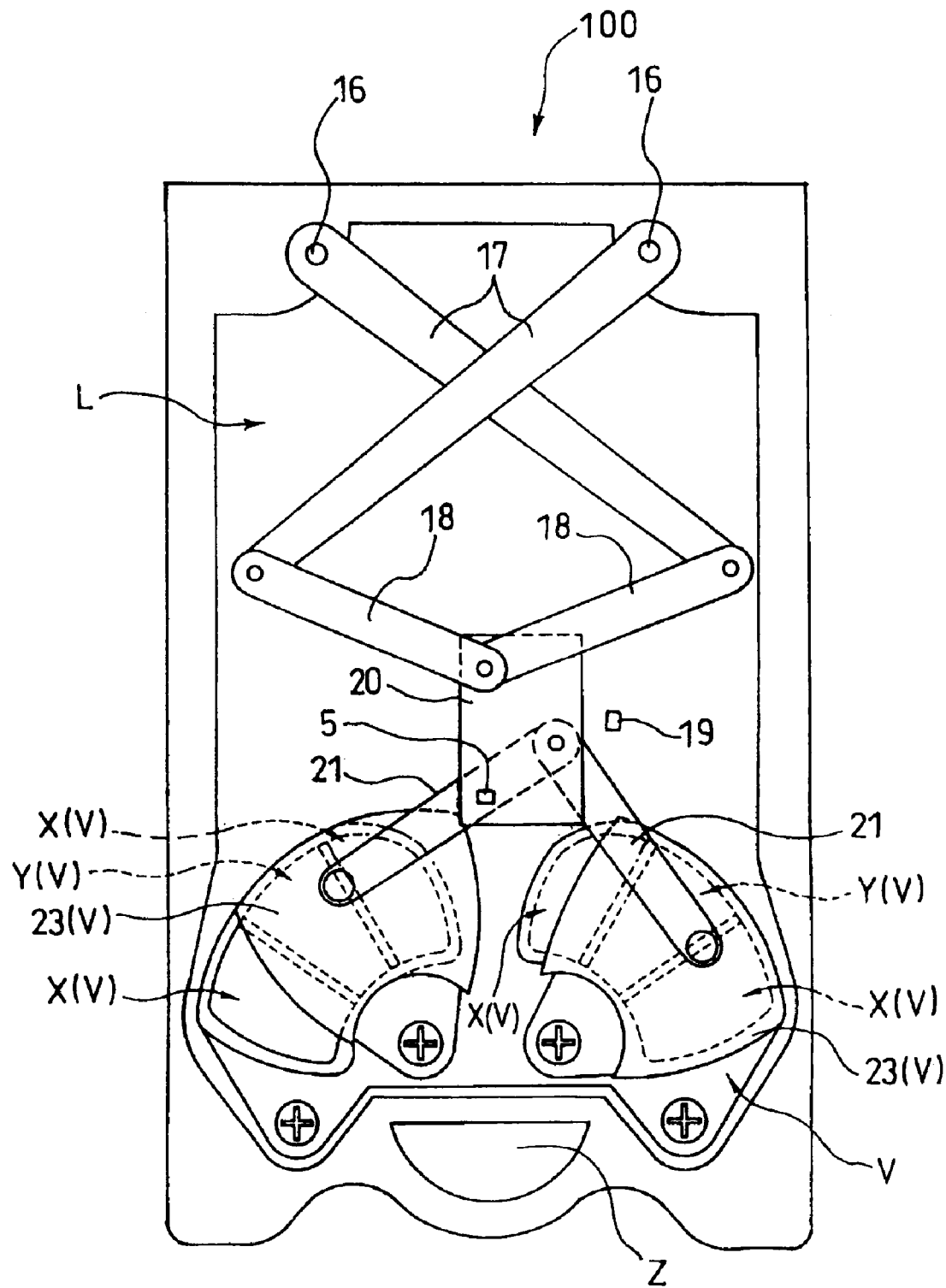
FIG. 4. A plan view of the characteristic section of the membrane-type gas meter.

FIG. 1 is a perspective view showing an overall membrane-type gas meter which is a flowmeter according to an embodiment of the present invention; FIG. 2 is a longitudinal cross-sectional view of the principal section of the membrane-type gas meter; FIG. 3 is an exploded perspective view of the principal section of the membrane-type gas meter; and FIG. 4 is a plan view of the principal section of the membrane-type gas meter of the present embodiment.

As shown in FIGS. 1 through 4, the membrane-type gas meter 100 constituting the flowmeter comprises a membrane 11 which effects single reciprocation in association with supply and discharge of a predetermined quantity of gas to and from a metering chamber 4 in a main body C (casing); and a movement conversion section M1 for converting the reciprocal movement of the membrane 11 into rotational movement. The gas meter 100 comprises a magnet 5 attached to either of a mechanism section M0, consisting of the membrane 11 (or a membrane section F which will be described later) and the movement conversion section M1, and the main body C; and a direction sensor 6 which is fixed to the remaining one of the mechanism section M0 and the main body C and which detects a relative position (direction) with respect to the magnet 5. In the present embodiment, the magnet is placed on a rotary disk 20 serving as a rotation section which effects rotational movement in response to reciprocal movement of the membrane 11. The rotary disk 20 constitutes a portion of the movement conversion section M1. As will be described later, the direction sensor 6 for detecting the direction of the magnet 5 is provided in an upper casing section C2, constituting a portion of the main body, and fastened to the main body.

More detailed descriptions are now provided. As shown in FIG. 1, the membrane-type gas meter 100, which serves as a flowmeter of the embodiment of the present invention, is assembled by use of a casing C having a gas supply port 2a and a gas discharge port 2b. The gas meter is connected to an intermediate location along a gas supply pipe (omitted from the drawings), which supplies a gas to a consumer such as a household, by way of the gas supply port 2a and the gas discharge port 2b. A flow rate of a gas flowing through the gas supply pipe is measured, and the thus-measured gas flow rate is displayed on a display section 3 provided outside the casing C. The casing C is formed from a lower casing section C1 and the upper casing section C2, to thus constitute a main body.

As shown in FIG. 3, the membrane-type gas meter 100 is built by assembling within the casing C a valve section V for controlling supply and discharge of a gas to and from the metering chamber 4; the membrane section F which reciprocates in response to the supply and discharge of a gas to and from the metering chamber 4; a rotation section R1 which is synchronously joined to the membrane section F by means of a link mechanism L such that one rotation is effected by single reciprocation of the membrane section F; and a controller 7 serving as a computing section which determines a flow rate and causing the display section 3 to display the thus-determined flow rate.

In view that the gas meter is well known, detailed descriptions and illustrations thereof are omitted. In addition to the controller 7, the direction sensor 6 (see FIG. 5) for detecting the direction of the magnet 5 (see FIG. 4), which will be described later, is provided in the upper casing section C2. Although not illustrated, the gas meter is additionally equipped with a pressure sensor for detecting the pressure of a gas supplied to the membrane-type gas meter 100, a seismoscope for detecting vibrations of an earthquake, and a gas supply cutoff valve. The gas meter is configured such that, in the event of occurrence of an anomaly such as the pressure sensor having detected an anomalous pressure or the seismoscope having detected an earthquake, the controller 7 controls cutoff of the gas supply cutoff valve and displays anomaly information on the display section. In FIG. 1, reference numeral 8 designates a reset shaft cap for covering an operation section of a reset shaft (not shown) used for releasing the gas supply cutoff valve from a cutoff state.

As shown in FIGS. 2 and 3, the center of the lower casing section C1 is partitioned by a partition wall 9. An essentially-cylindrical space, which is used for forming a metering chamber and takes the partition wall 9 as a bottom, is provided on either side of the partition wall 9. The center of each of the spaces is partitioned by the membrane section F, and an opening section of each of the spaces is closed with a cover 10. Thus, the metering chamber 4 is formed on either side of the respective membrane sections F. In short, the membrane section F is provided in the number of two, thereby forming four of the metering chambers 4.

By reference to FIGS. 2 and 3, additional explanations are given to the membrane section F. The membrane section F comprises the membrane 11, a circular membrane plate 12 retained in the center of the surface of the membrane 11; and a hinge mount 13 held in the center of the outer membrane plate 12. The membrane section F is provided while the brim of the membrane 11 is held in the lower casing section C1 by means of a frame-shaped film-fixing plate 14.

One end of a wing 15 is pivotally supported by the hinge mount 13 of each of the membrane sections F. The shaft center of a wing shaft 16 is oriented in its vertical direction, and the wing shaft 16 is pivotally supported while the upper end of the wing shaft hermetically penetrates through a hole formed in an upper wall of the lower casing section C1. The lower end of the wing shaft 16 is joined to a side of the wing 15 opposite its pivotally-supported side.

As shown in FIGS. 3 and 4, the link mechanism L comprises two sets, each set consisting of a large gate hook 17 and a small gate hook 18 whose ends are pivotally joined together. One end of each of the large gate hooks 17 is pivotally joined to the upper end of the respective wing shaft 16.

As shown in FIGS. 3 and 4, the valve section V is provided on an upper wall of the lower casing section C1 so as to control the supply and discharge of the gas to the four metering chambers 4, and the valve section V is opened and closed by reciprocal movement of the membrane section F.

Additional explanations are given to the valve section V by reference to FIG. 4. Two gas supply/discharge ports X, which remain in mutual communication with the respective two metering chambers 4 which oppose each other via the membrane 11, are separated from each other side by side on the upper wall of the lower casing section C1. Two sets, each set consisting of the two gas supply/discharge ports X, are provided, and a gas discharge port Y is interposed between the gas supply/discharge ports X of each of the respective sets. In short, there are formed two lines of supply/discharge openings, wherein two gas supply/discharge ports X are positioned on the sides of the gas discharge port Y in each line.

The gas discharge port Y of each line of supply/discharge opening sections is connected to a gas discharge connection port Z formed in the upper wall of the lower casing section C1 to thus form a gas discharge path (omitted from the drawings). The gas discharge connection port Z is connected to the gas discharge port 2b by way of a gas discharge path (omitted from the drawings) provided in the upper casing section C2 while the upper casing section C2 is placed on top of the lower casing section C1.

A pivotal valve 23 is provided above each line of supply/discharge opening sections, so as to become pivotal around the vertical shaft section of the valve along a direction in which the supply/discharge opening sections are arranged side by side. The pivotal valve 23 is coupled to the rotary disk 20, which will be described alter, by means of a pair of arms 21, 25.

A concave portion used for establishing communication (omitted from the drawings) (hereinafter called a "communication concave portion") is formed in the back of the pivotal valve 23. When situated at each pivoted end, the pivotal valve 23 connects the gas supply/discharge port X located at a position close to the pivotal end with the gas discharge port Y by way of the communication concave portion, to thus open the gas supply/discharge port X located at the end opposite the pivoted end. When situated in the center with respect to the pivotal direction, the pivotal valve 23 closes both the gas supply/discharge ports X.

As shown in FIG. 4, the rotation section R1 has the rotary disk 20. One end of the small gate hook 18 is pivotally attached to the rotary disk 20, and the other end of an arm 21 whose one end is connected to the pivotal valve 23 is pivotally supported by the rotary disk 20.

The magnets 5 are fixed onto the rotary disk 20 which constitutes the movement conversion section M1 and, by extension, a portion of the mechanism section M0. In association with rotation of the rotary disk 20, the magnets 5 effect rotational movement. A counter 19 is provided below the rotary disk 20, to thus count the number of rotations of the rotary disk 20.

By means of the rotary disk 20 and the link mechanism L, the movement conversion section M1 for converting the reciprocal movement of the membrane 11 into rotational movement is constituted. The mechanism section M0 is formed from the movement conversion section M1 and the membrane 11. Accordingly, the magnets 5 are attached to the rotary disk 20, which is one of the mechanism section M0 and the main body C, and the direction sensor 6 is attached to the main body C, which is the other one of the mechanism section M0 and the main body C.

Consequently, when a gas has been supplied to or discharged from the metering chambers 4, the membrane 11 is reciprocally actuated, to thus rotate the wing shaft 16. The large gate hook 17 of the link mechanism L is pivoted by rotation of the wing shaft 19, to thus rotate the rotary disk 20 by way of the small gate hook 18. The arm 21 is pivoted by rotation of the rotary disk 20, to thus actuate the pivotal valve 23.

Figure 5:
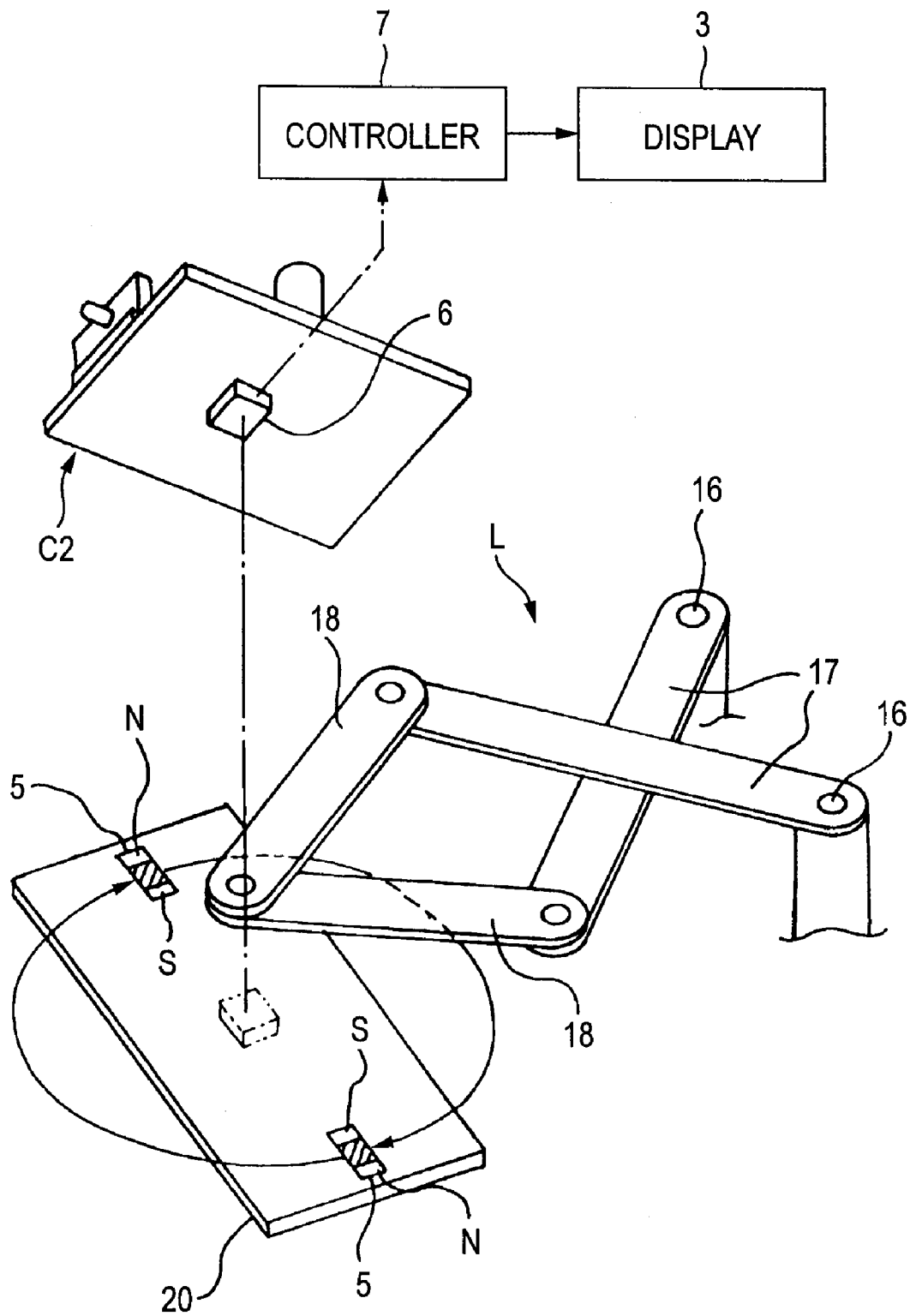
FIG. 5. An exploded perspective view showing a relationship between the position of a magnet provided on a rotary disk and the position of a direction sensor.

FIG. 5 shows a positional relationship between the magnets 5 attached to the rotary disk 20 and the direction sensor 6 attached on the lower surface of the upper casing section C2.

Since the direction sensor 6 is already well known, its detailed descriptions are omitted. A two-axis magnetic direction sensor into which an MR element, a thin-film coil, a drive circuit, and the like, are integrated is popular, and the direction sensor can detect the direction of a magnetic flux. A three-dimensional sensor, such as a Wheatstone bridge, may be adopted as the direction sensor 6.

As shown in FIG. 5, the link mechanism L is actuated in association with reciprocal movement of the membrane 11 to thus rotate the rotary disk 20, and hence the magnets 5 attached onto the rotary disk 20 perform a rotational movement; e.g., movement of a complete circle, oval movement, elliptical movement, movement of a closed curve, or the like. The direction sensor 6 is provided on the lower surface of the upper casing C2 so as to come inside the rotational movement. Placing the direction sensor 6 in the center of rotational movement is desirable.

As shown in FIG. 5, when the rotary disk 20 has been rotated by the link mechanism L, the magnets 5 provided on the rotary disk 20 are also rotated. However, as shown in FIG. 6(A), the pole (e.g., the S pole) situated facing the direction sensor 6 remains constant at all times.

Figure 6:
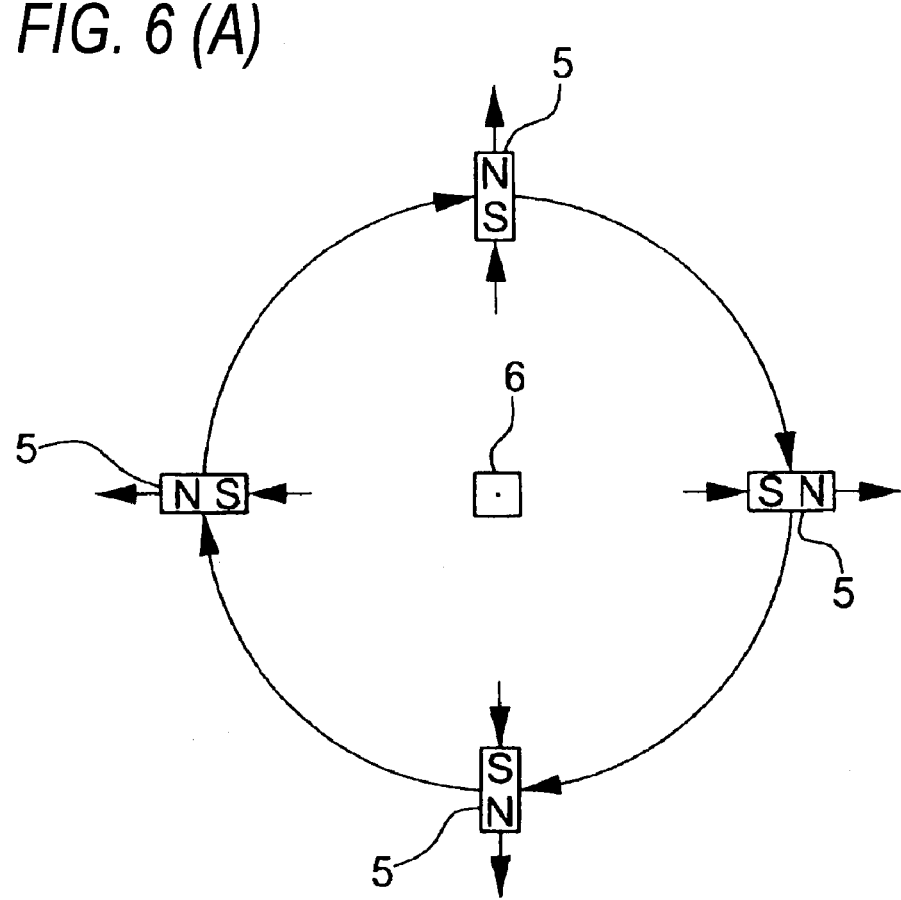
FIG. 6. (A) A plan view showing the status of a magnet which rotates around the direction sensor; and (B) A graph showing variations in the direction of a magnetic flux detected by the direction sensor.
Figure 6:
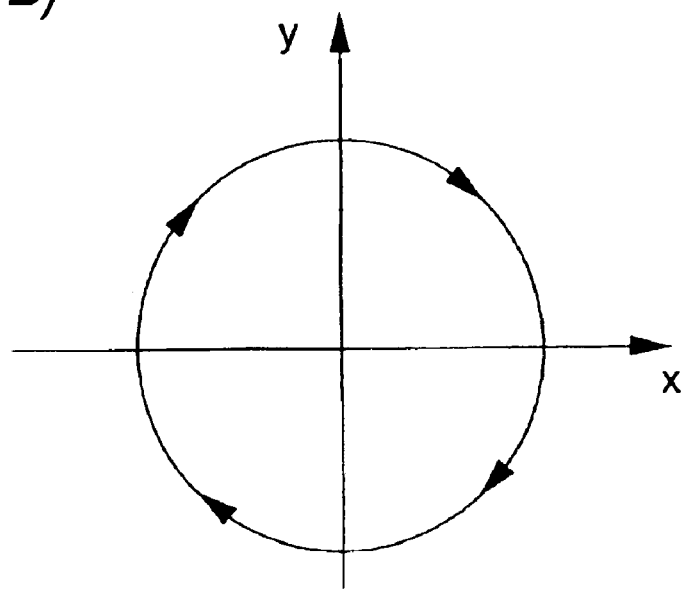

Specifically, as shown in FIG. 6(A), when the magnets 5 are rotated around the direction sensor 6 while the same pole remains facing the direction sensor 6, the direction of the magnetic flux changes in association with rotational movement of the magnets 5. Accordingly, as shown in FIG. 6(B), the direction sensor 6 can detect the positions of the magnets 5 from the direction of the magnetic flux.

Thereby, the rotational angle of the rotary disk 20 can be ascertained, and the status of reciprocal movement of the membrane section F can further be detected. Therefore, the resolution of metering of the flow rate can be enhanced. Although the rotating status of the rotary disk 20 can be detected at all times, performing detection at an arbitrary interval in order to lessen dissipation of a battery provided in the flowmeter 1 is desirable.

In relation to the above flowmeter 1, there has been described the case where the magnets 5 perform rotational movement and where the direction sensor 6 is placed at the center of the rotational movement. The same also applies to a case where the direction sensor 6 is placed not at the center but inside the rotational movement.

Figure 7:
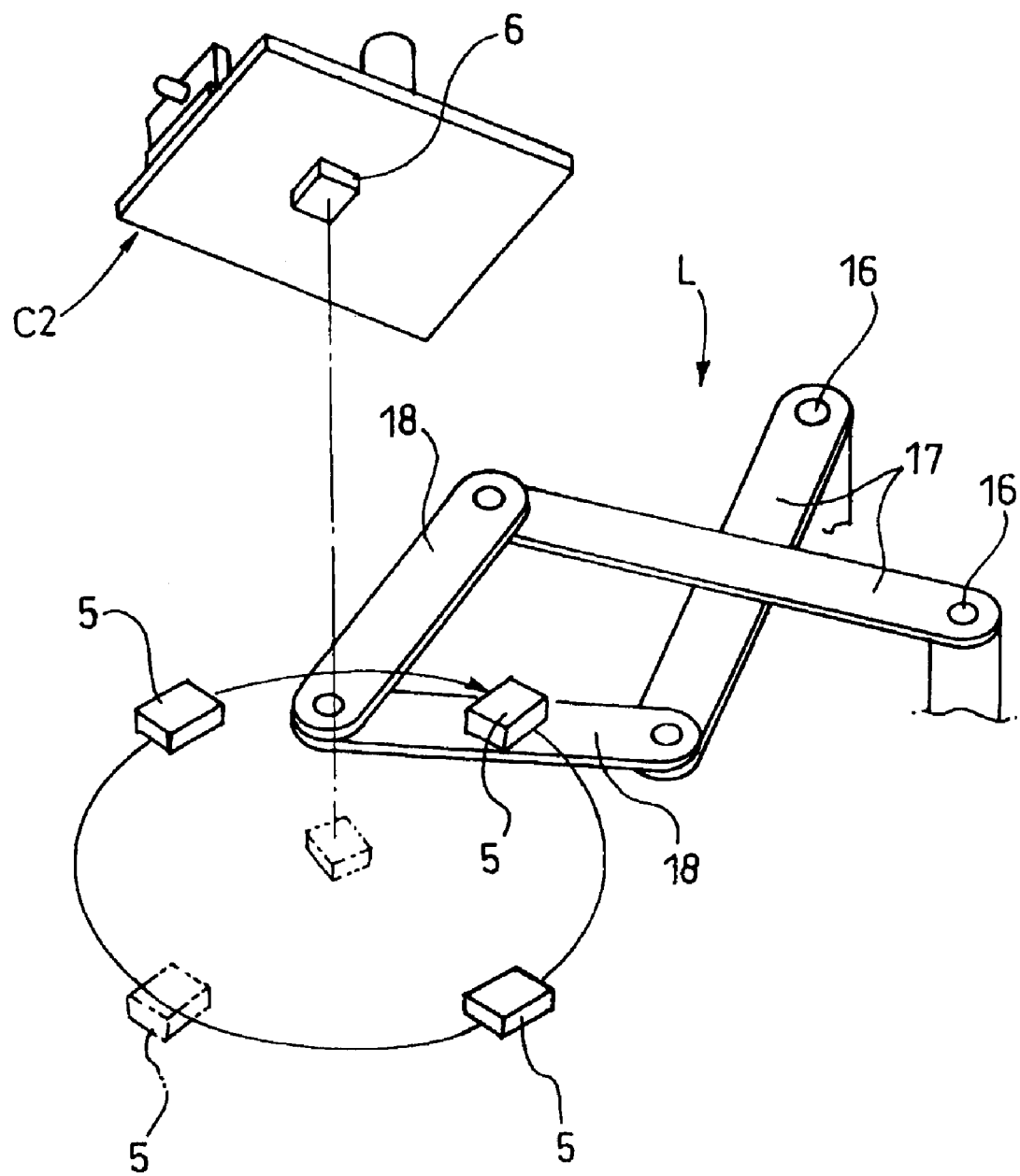
FIG. 7. An exploded perspective view showing a relationship between the position of a magnet provided on a link mechanism and the position of the direction sensor.
Figure 8:
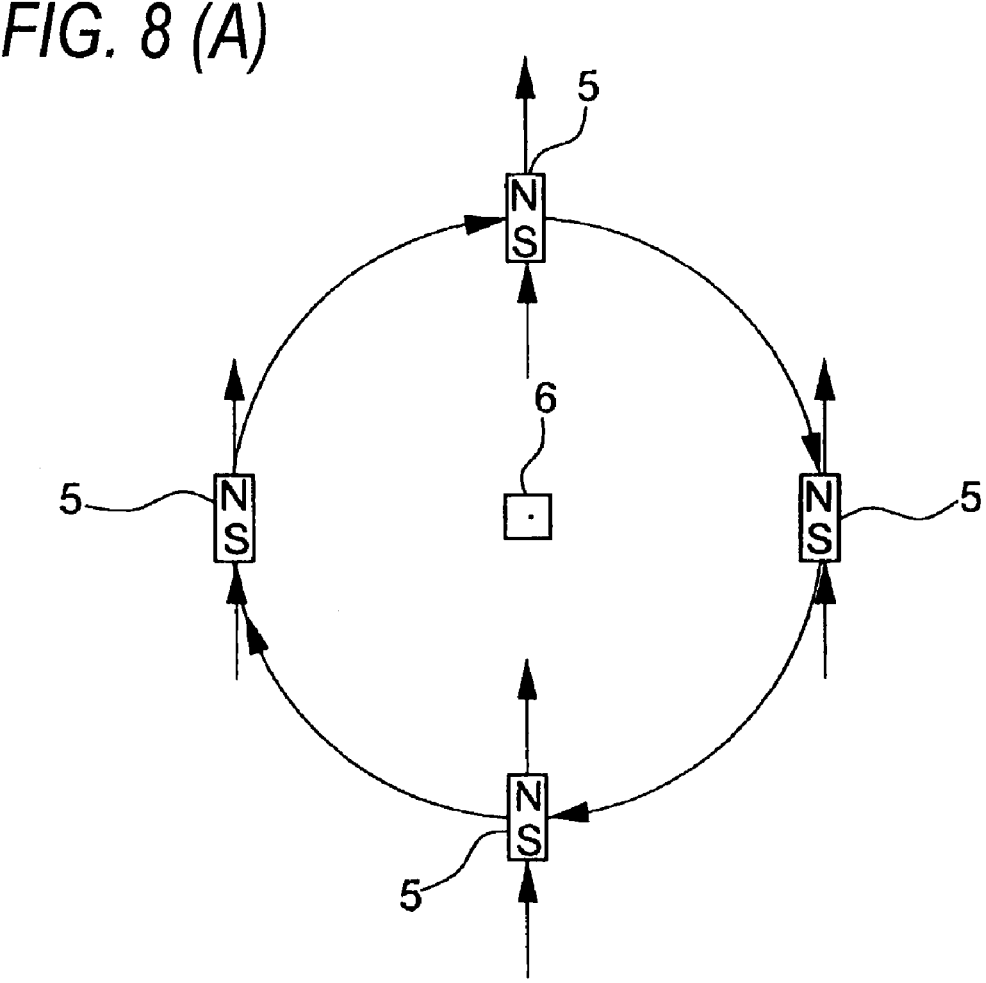
FIG. 8. (A) A plan view showing the status of a magnet which rotates around the direction sensor; and (B) A graph showing variations in the direction of a magnetic flux detected by the direction sensor.
Figure 8:
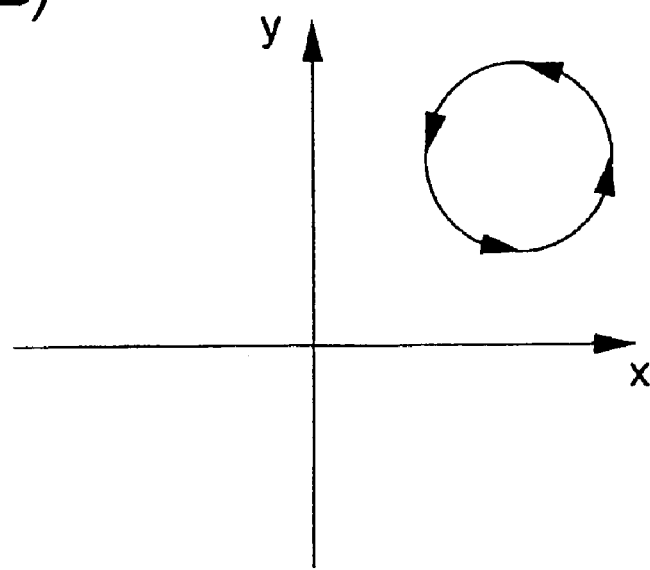

In the above flowmeter 1, the magnets 5 are provided on the rotary disk 20, and the single pole is arranged to face the direction sensor 6 at all times. However, the present invention is not limited to this layout. As shown in FIG. 7, even when the magnet 5 is placed on the short gate hook 18 of the link mechanism L, the magnet 5 forms a closed curve. Hence, the magnet can be detected. In this case, rotation is performed while the magnet 5 is performing parallel movement. Hence, the pole facing the direction sensor 6 changes along with rotational movement. As shown in FIG. 8(A), for instance, when rotation is effected while the N pole of the magnet 5 remains oriented upward in FIG. 8, the S pole faces the direction sensor 6 when the magnet 5 is located above the direction sensor 6. When the magnet 5 has come to the position below the direction sensor 6, the N pole faces the direction sensor 6. In this case, as shown in FIG. 8(B), the direction sensor 6 detects the direction of a magnetic flux.

Further, the direction sensor 6 can also be located outside the magnet 5 that performs rotational movement. Alternatively, the magnet 5 can also be placed at the center of rotational movement, and the direction sensor 6 may be rotated.

Second Embodiment

There will now be described a second embodiment of the present invention. Those elements which are common to the first embodiment are assigned the same reference numerals, and their repeated explanations are omitted.

Figure 9:
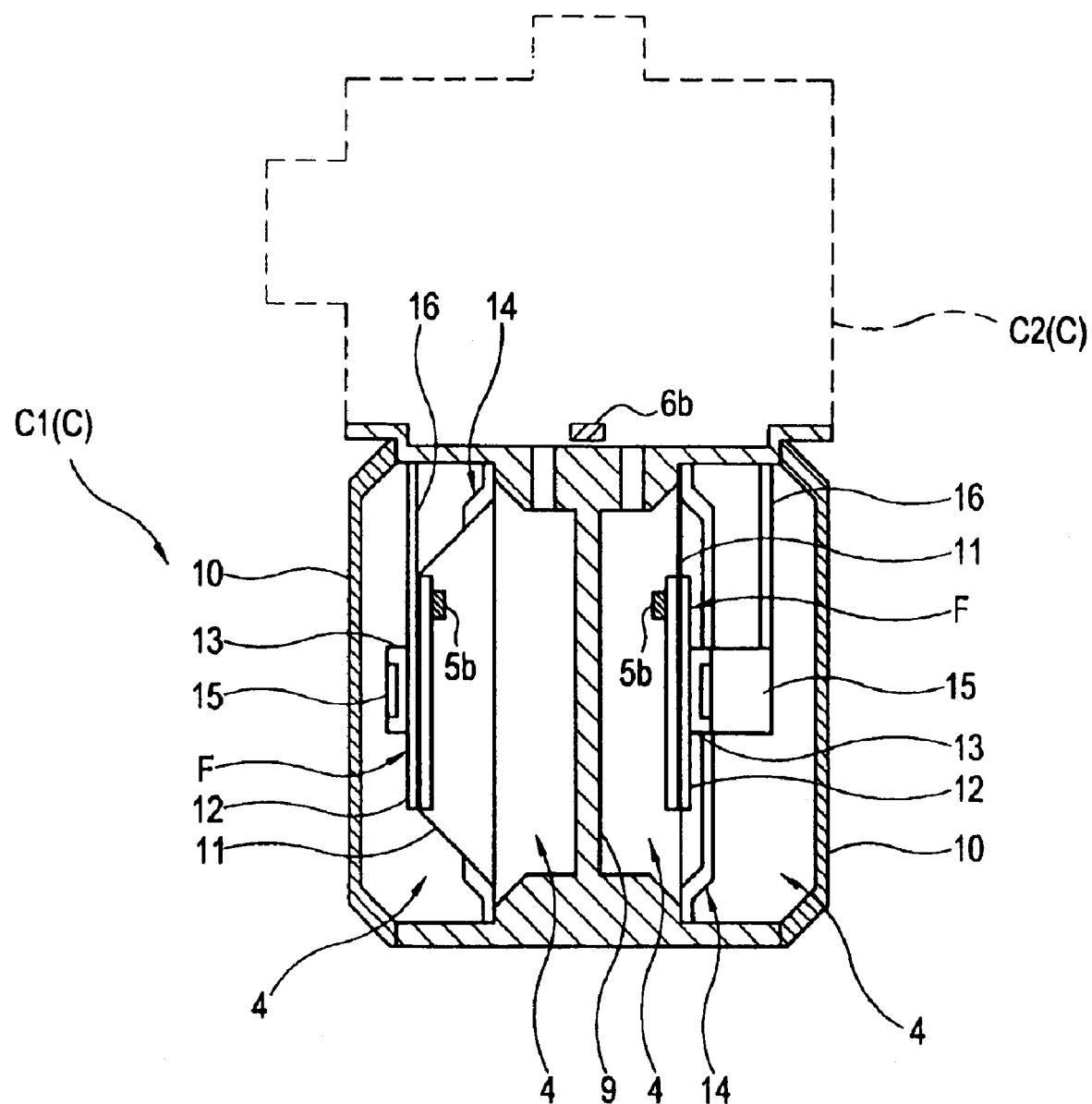
FIG. 9. A longitudinal cross-sectional view of a characteristic section of a membrane-type gas meter according to a second embodiment.
Figure 10:
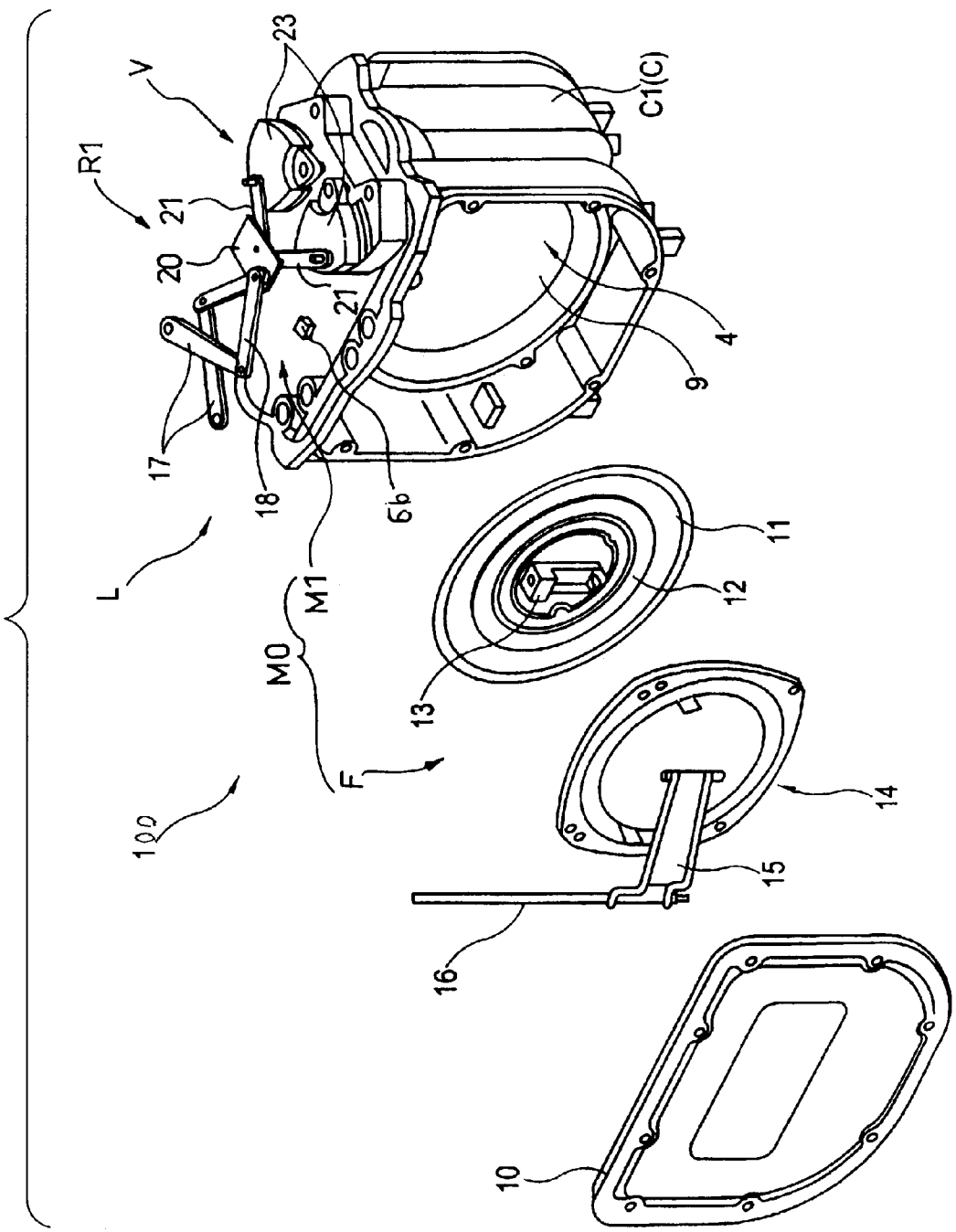
FIG. 10. An exploded perspective view of the characteristic section of the membrane-type gas meter according to the second embodiment.

FIGS. 9 and 10 show the membrane-type gas meter 100 corresponding to a flowmeter of the second embodiment. In this membrane-type gas meter 100, magnets 5b are provided on the membranes 11 serving as either of the mechanism section M0 and the casing C or at positions where the magnets are reciprocally moved along in conjunction with the membranes 11. In the meantime, a direction sensor 6b is provided on the casing C (e.g., on the upper surface of the lower casing C1 in FIG. 2) which is the remaining one of the mechanism section M0 and the casing C.

By means of the above configuration, when a gas is supplied to or discharged from the metering chamber 4, the membrane 11 is reciprocally moved, so that the magnet 5b is also reciprocally moved in an integrated fashion. The direction sensor 6b disposed in place detects reciprocal movement of the magnet 5b, thereby metering a flow rate on the basis of the position of the membrane 11.

In this case, the magnet 5b attached to the membrane 11 does not need wiring. Hence, the magnet 5b can be readily attached to the membrane 11, so that the structure used for attaching the magnet is also simple.

Third Embodiment

Figure 11:
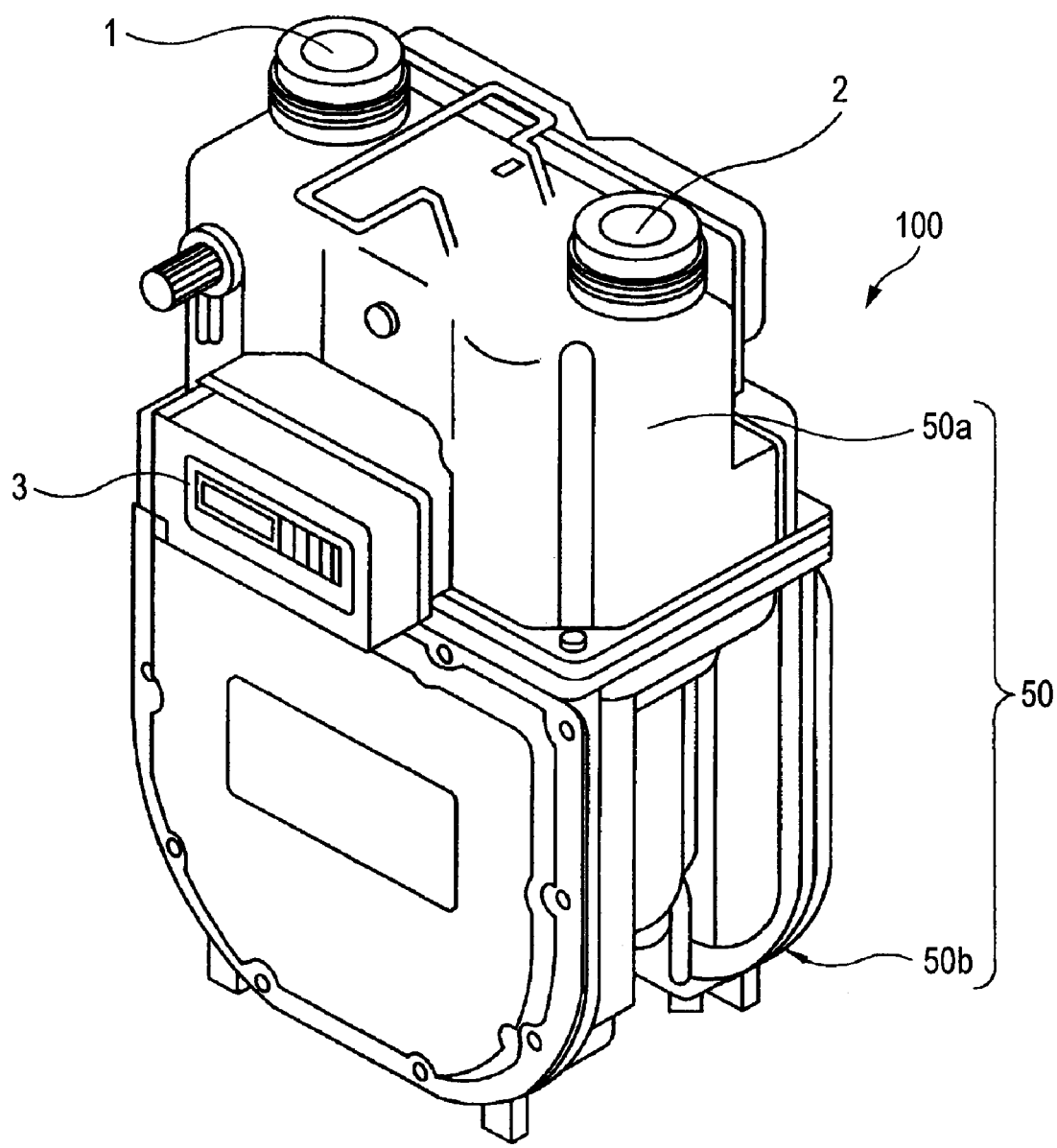
FIG. 11. A perspective view of the membrane-type gas meter according to the third embodiment.

FIG. 11 shows a third embodiment where the flowmeter of the present invention is applied to a gas meter. A casing 50 constituting the main body of the gas meter 100 is divided into an upper casing 50a and a lower casing 50b. The upper casing 50a is provided with a gas supply port 1 and a gas discharge port 2. The gas meter 100 is connected to an intermediate location along a gas supply pipe, which supplies a gas to a consumer such as a household, by way of the gas supply port 1 and the gas discharge port 2, thereby metering a flow rate of a gas flowing through the gas pipe. A counter 3 provided on the main body 50 displays the thus-measured gas flow rate.

Figure 13:
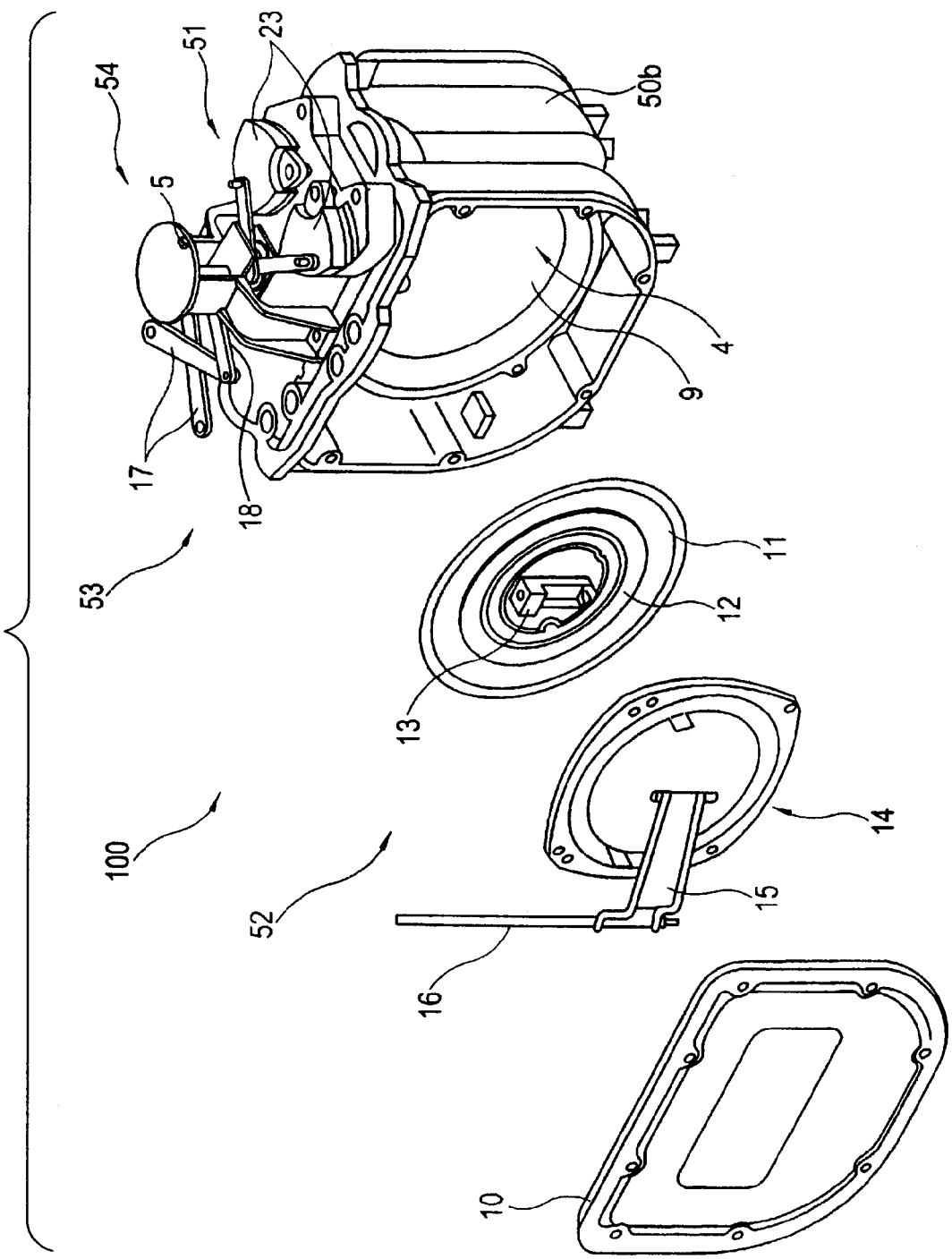
FIG. 13. An exploded perspective view of the membrane-type gas meter.

As shown in FIG. 13, the gas meter 100 comprises a valve section 51 for controlling supply and discharge of a gas to and from the metering chambers 4 formed in the lower casing 50b; membrane sections 52 which are reciprocally moved by means of supply and discharge of a gas to and from the metering chambers 4; and a rotary member 54 synchronously joined to the membrane sections 52 by way of a link mechanism 53 so as to rotate once in response to single reciprocation of the membrane sections 52. The gas meter 100 is a so-called membrane-type gas meter having the membrane sections 52. The membrane sections 52 determine the shapes and volumes of the metering chambers 4 within the lower casing 50b.

The magnet 5 is placed at a position on the rotary member 54 radially spaced from the rotary shaft thereof. Pursuant to reciprocal movement of the membrane sections 52, the magnet 5 is circulatory moved along a circulatory orbit around the axis of the rotary member 54 in conjunction therewith.

In addition to the controller 7, a pressure sensor for detecting the pressure of a gas, a seismoscope for detecting vibration such as an earthquake, a gas supply cutoff valve, and the like, are provided within the upper casing 50a. A well-known mechanism can be adopted as a mechanism for these elements.

Figure 12:
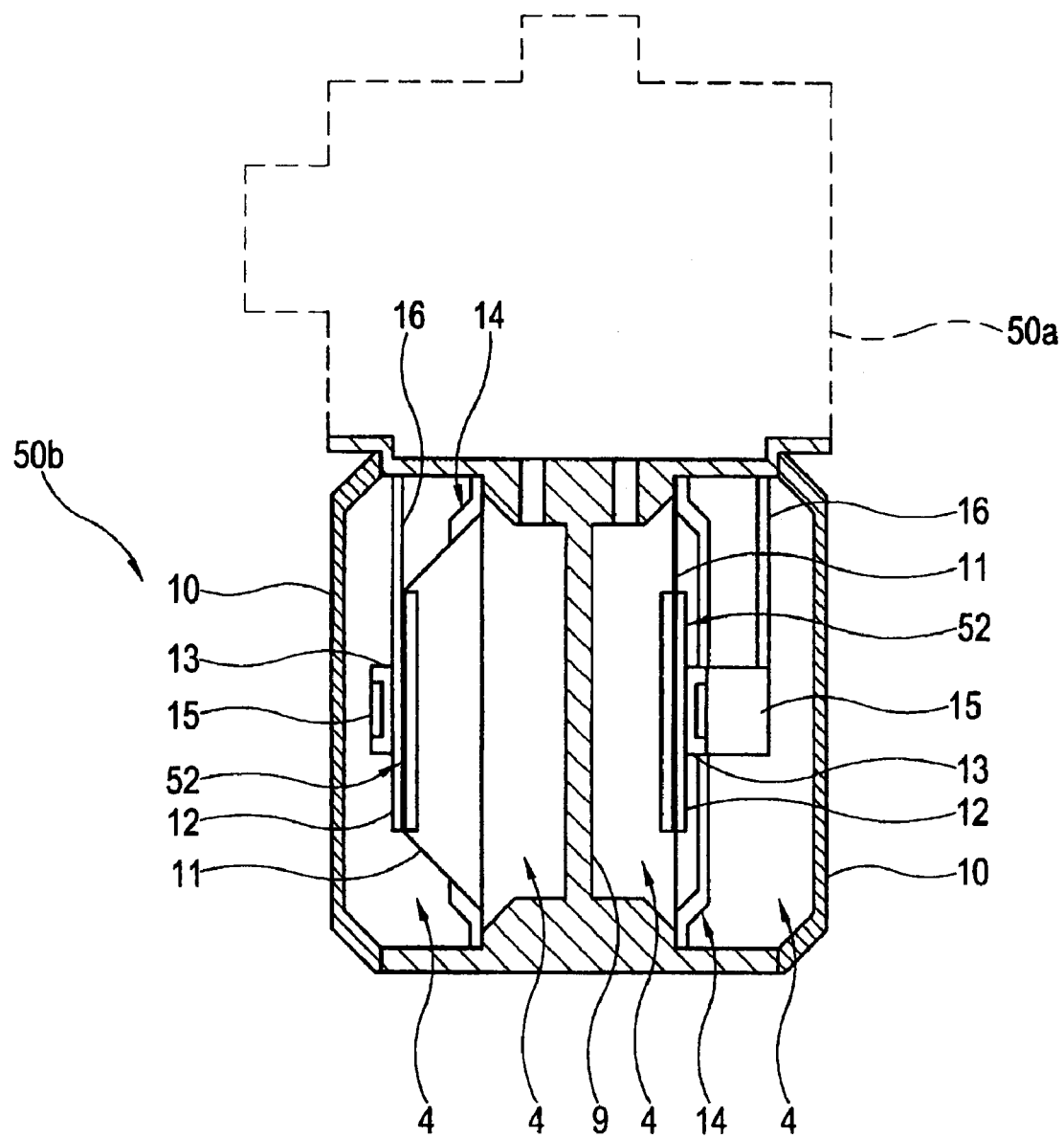
FIG. 12. A cross-sectional view of a lower casing of the membrane-type gas meter.

As shown in FIGS. 12 and 13, the center of the lower casing section 50b is partitioned by the partition wall 9. An essentially-cylindrical space, which is used for forming a metering chamber and takes the partition wall 9 as a bottom, is provided on either side of the partition wall 9. The center of each of the spaces is further partitioned by the membrane section 52, and an opening section of each of the spaces is closed with the cover 10. Thus, the metering chamber 4 is formed on either side of the respective membrane sections 52. In short, the pair of membrane sections 52 are provided, and the four metering chambers 4 are formed.

As shown in FIGS. 12 and 13, the membrane section 52 comprises the membrane 11, the circular membrane plate 12 retained in each of the centers of respective surfaces of the membrane 11; and the hinge mount 13 held in the center of the outer membrane plate 12. The brim of the membrane 11 is held in the lower casing section 50b by means of the frame-shaped film-fixing plate 14.

One end of a connecting plate 15 is pivotally supported by the hinge mount 13 of each of the membrane sections 52. The lower end of the wing shaft (or wing shafts) 16 is joined to the other end of wing 15, and the upper end of the shaft 16 passes through the hole formed in the upper wall of the lower casing 50b up to the inside of the upper casing 50a.

Figure 14:
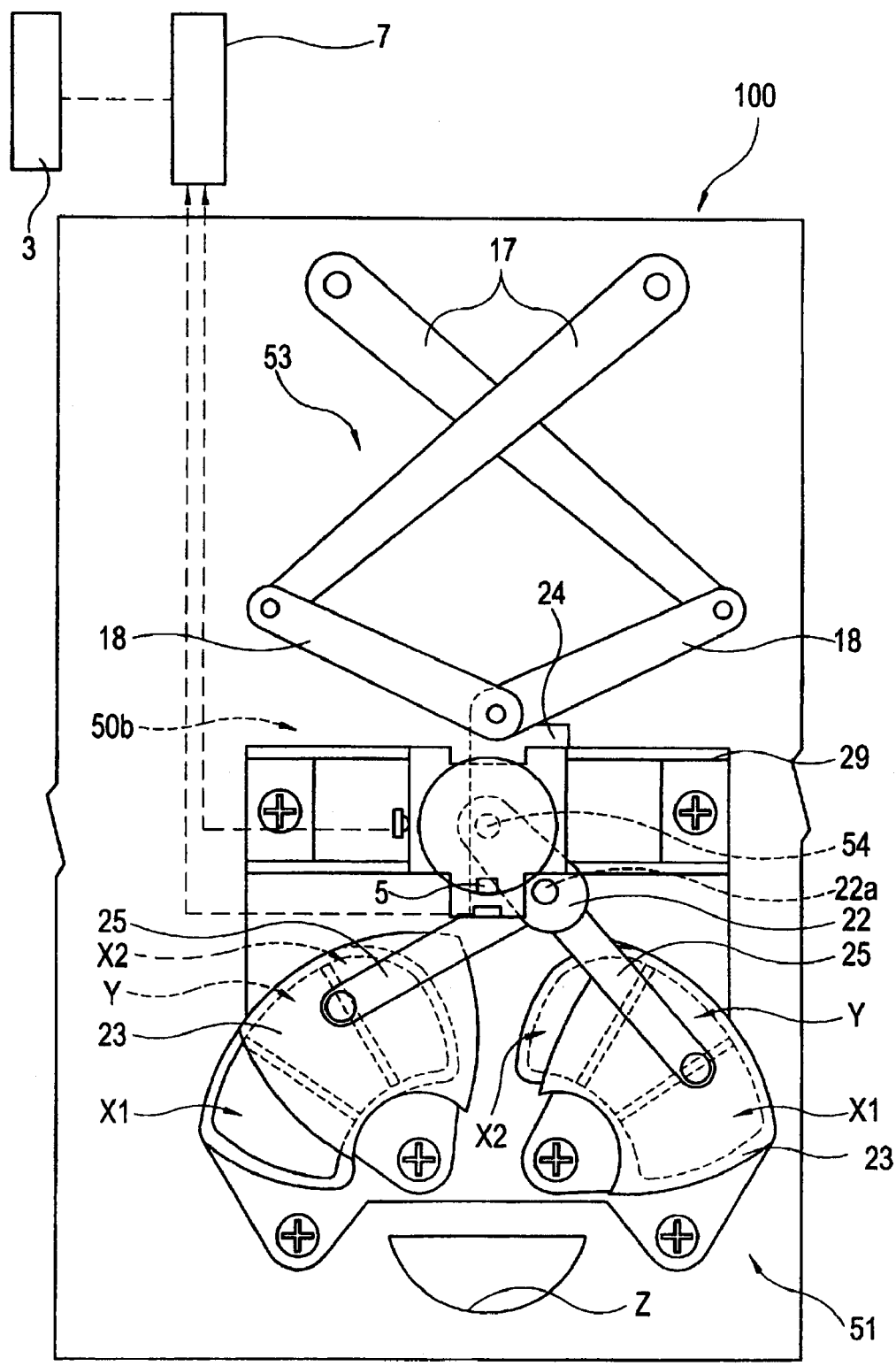
FIG. 14. A plan view of a link mechanism, a rotary member, and a valve section, all of which are provided within the lower casing of the membrane-type gas meter.

As shown in FIGS. 13 and 14, the link mechanism 53 comprises two sets, each set consisting of the large arm 17 and the small arm 18 whose ends are pivotally joined together. One end of each of the large arms 17 is pivotally joined to the upper end of each of the wing shaft (or wing shafts) 16.

Figure 15:
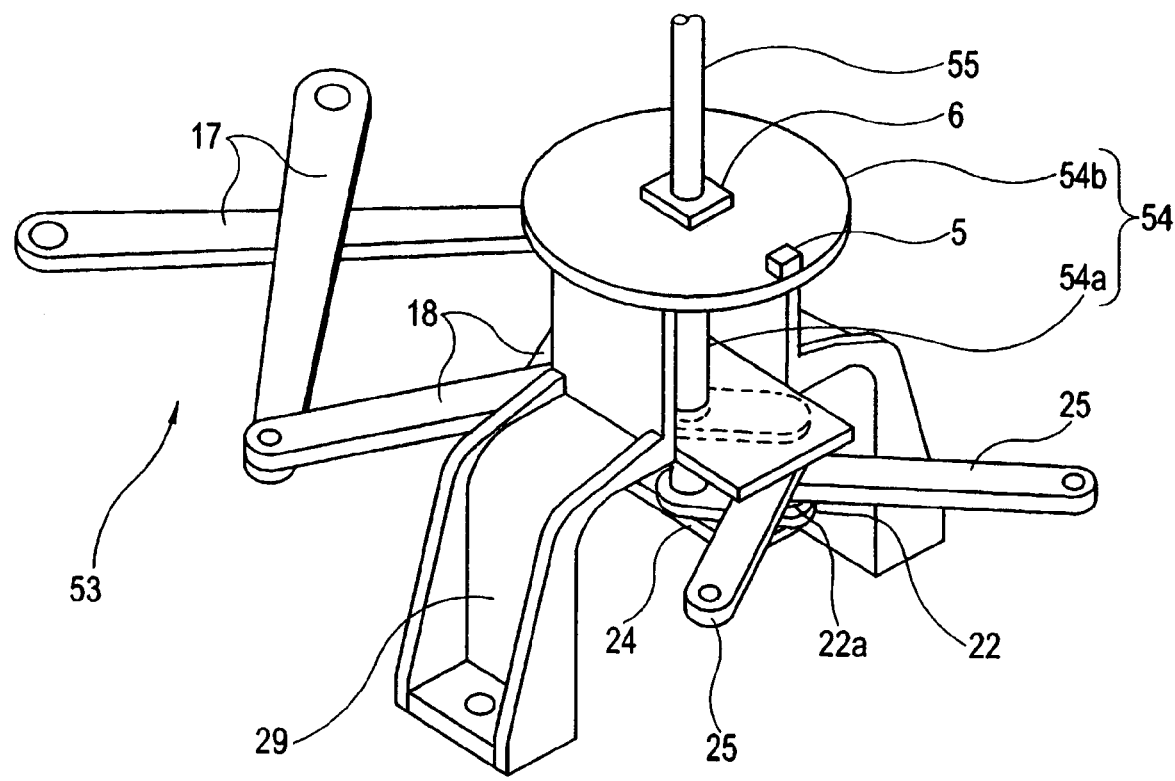
FIG. 15. An exploded perspective view of the neighborhood of a rotary member of the membrane-type gas meter.

As shown in FIGS. 14 and 15, the rotary member 54 comprises a crank shaft 54a which is supported by the support mount 29 attached to the upper wall of the lower casing 50b so as to be rotatable around a vertically-extending axis; and a rotary disk 54b which is attached concentrically to the upper end of the crank shaft 54a and assumes a circular shape when viewed from above. A crank arm 22 is attached to the crank shaft 54a while radially projecting to the outside.

In the present embodiment, the single magnet 5 is placed at a position which is radially spaced from the rotary shaft of the rotary member 54. The magnet 5 is placed along an outer brim of the rotary disk 54b of the rotary member 54. Further, the magnetic direction sensor 6 is placed at a position above the center of the surface of the rotary member 54. The magnetic direction sensor 6 is placed at the rotational center axis of the rotary member 54. Consequently, a distance between the magnetic direction sensor 6 and the magnet 5 is uniform over the entire rotating direction (the circumferential direction) of the rotary member 54.

As shown in FIGS. 13 and 14, the valve section 51 is provided on the upper wall of the lower casing section 50b so as to control the supply and discharge of the gas to the four metering chambers 4, and the valve section 51 is opened and closed by reciprocal movement of the membrane section 52.

As shown in FIG. 14, two gas supply/discharge ports X1, X2, which remain in mutual communication with the respective two metering chambers 4 which oppose each other via the membrane 11, are separated from each other on the upper wall of the lower casing section 50b. The gas output hole Y is formed between the gas supply/discharge holes X1 and X2. In short, the two gas supply/discharge ports X1, X2 are formed while being located on both sides of the gas discharge port Y. A line of holes is formed from the gas supply/discharge holes X1, X2 and the gas discharge hole Y. Two lines of holes are formed in the upper wall of the lower casing 50b.

The gas discharge port Y is connected to the gas discharge connection port Z formed in the upper wall of the lower casing section 50b by way of the gas discharge path (omitted from the drawings). The gas discharge connection port Z is connected to the gas discharge port 2 by way of the gas discharge path (omitted from the drawings) provided in the upper casing section 50a.

The pivotal valve 23 is provided above each line of holes, so as to become pivotal around the vertical shaft section of the valve along a direction in which the supply/discharge holes are arranged side by side. The communication concave portion (omitted from the drawing) is formed in the back of the pivotal valve 23. When situated at each pivoted end, the pivotal valve 23 connects the gas supply/discharge port X located at a position close to the pivoted end with the gas discharge port Y by way of the communication concave portion, to thus open the gas supply/discharge port X located at the end opposite the pivoted end. When situated in the center with respect to the pivotal direction, the pivotal valve 23 closes both the gas supply/discharge ports X.

As shown in FIGS. 14 and 15, a crank mount 24 is positioned at a location beneath the crank arm 22 attached to the crank shaft 54a of the rotary member 54. One end of the crank mount 24 is pivotally supported by a shaft section 22a that is provided at the leading end of the crank arm 22 such that the axis of the shaft section 22a is vertically oriented.

In the meantime, the upper end of the wing shaft (or wing shafts) 16 is pivotally supported by one end of each of the longer arms 17, and one end of each of the shorter arms 18 is pivotally supported at a position offset from the pivotal axis of the crank arm 22 in the crank mount 24. By means of this configuration, the membrane section 52 and the rotary member 54 are synchronously coupled together.

Two crank rods 25 coupled to the shaft section 22a of the crank arm 22 are linked to the respective pivotal valves 23. When the pair of membrane sections 52 have caused single reciprocation, the respective wing shaft (or wing shafts) 16 pivot through a predetermined angle. In association with pivotal movement of the wing shaft (or wing shafts) 16, the rotary member 54 is rotated once by the link mechanism 53. The respective pivotal valves 23 are pivoted, to thus control supply and discharge of a gas to and from the four metering chambers 4.

The valve section 51 comprises the two pivotal valves 23 and two lines of holes corresponding to the pivotal valves. By means of pivotal movements of the two pivotal valves 23, a gas is supplied to and discharged from the four metering chambers 4. The wing shaft (or wing shafts) 16 and the valve section 51 are coupled together by means of the link mechanism 53 and the crank mechanism formed from the crank shaft 20 and the crank arm 22, such that the valve sections 51 are opened or closed by means of reciprocal movements of the membrane sections 52.

By reference to FIG. 16, control of supply and discharge of a gas to and from the four metering chambers 4 will now be described. The four metering chambers 4 are indicated as 4a, 4b, 4c, and 4d from left to right. Similarly, the four gas supply/discharge ports X are indicated as Xa, Xb, Xc, and Xd from left to right.

FIG. 16(a) shows a state where the left pivotal valve 23a is stopped and the right pivotal valve 23b opens the gas supply/discharge hole Xd, to thus bring the gas supply/discharge hole Xc into mutual communication with the gas discharge port Y. In this state, the membrane section 52 is pushed toward the metering chamber 4c under the pressure of the gas flowing into the metering chamber 4d, and hence the gas in the metering chamber 4c is discharged by way of the gas discharge hole Y. The rotary member 54 is rotated by means of movement of the membrane section 52, and the left pivotal valve 23a is moved rightward, whereupon the gas supply/discharge hole Xa is opened. When the gas starts flowing into the metering chamber 4a, the gas filled in the metering chamber 4b starts being discharged (FIG. 16(b)).

By means of movement of the membrane section 52 achieved at this time, the right pivotal valve 23b is activated rightward, thereby opening the gas supply/discharge hole Xc. The gas starts flowing into the metering chamber 4c, and the gas filled in the metering chamber 4d starts being discharged (FIG. 16(c)). Subsequently, processing operations pertaining to FIGS. 16(d), 16(a), 16(b), and 16(c) are consecutively iterated in this sequence.

When each of the pair of membrane sections 52 has effected single reciprocation, the rotary member 54 rotates once. The magnet 5 provided on the rotary member 54 performs circumferential movement around the center of the rotary member 54 and around the magnetic direction sensor 6. Movement shown in FIG. 16 also applies to the first and second embodiments.

The magnetic direction sensor 6 is provided at a position above a rotary disk 54b of the rotary member 54, especially, a position above the rotation center of the rotary disk 54b (FIG. 15). In the present embodiment, the magnetic direction sensor 6 is fixed to an extremity of a pillar 55 extending from an upper interior wall of the upper casing 50a. The distance from the rotary disk 54b to the magnetic direction sensor 6 can be freely set, so long as the magnetic direction sensor 6 can detect changes in the magnetic field caused by the magnet 5. A controller 7 (FIG. 14) including a flow rate computing section, which determines a flow rate in accordance with a signal from the magnetic direction sensor 6 and causes the display section 3 to display the thus-determined flow rate, is housed in the upper casing 50a.

The method for fixing the magnetic direction sensor 6 is not limited to that described in connection with the embodiment, and various modes of the method can be adopted. For instance, when a circuit board on which electronic components, such as the controller 7 and the like, are mounted is placed at a position above the rotary member 54, the magnetic direction sensor 6 can be fixed to a lower surface of the circuit board so as to come to a position above the center of the rotary disk 54b.

The magnetic direction sensor 6 located at a position above the rotary member 54 is formed from a Wheatstone bridge formed from an MR element (a magneto-resistance effect element) and a thin-film coil. Two Wheatstone bridges are arranged such that directions of magnetic sensitivity axes intersect at right angles. Specifically, the magnetic direction sensor 6 is a two-axis magnetic field sensor having the X axis and the Y axis. X-axis components of the magnetic field are output as a potential difference Vx of each of the bridges, and Y-axis components of the same are output as a potential difference Vy of the same. The direction of the magnetic field can be two-dimensionally detected by means of determining a ratio of the potential difference Vx to the potential difference Vy. The thin-film coil applies a bias magnetic field used for enhancing the sensitivity of the MR element. As a matter of course, the configuration of the magnetic direction sensor 6 is not limited to that mentioned previously. A three-dimensional sensor to which a Wheatstone bridge is further added can also be used.

As a result of the magnetic direction sensor 6 capturing changes in the magnetic field of the magnet 5 rotating around the magnetic direction sensor 6, the position of the magnet 5 along the circumference is detected. Monitoring the position at all times enables analog grasping of an angular velocity ω of the magnet, and hence changes in a momentary flow rate can be ascertained. Moreover, from the viewpoint of power saving, the angular velocity of the magnet corresponding to an interval between two points in time (one second or the like) may be monitored at a predetermined sampling interval, thereby monitoring the flow rate at the predetermined sampling interval. In the case of the related-art combination of the magnet and the lead switch, a flow rate is detected by means of activation/deactivation of the switch induced when the magnet passes by the neighborhood of the lead switch. Hence, the frequency of monitoring action becomes likely to be limited by the number of magnets and/or lead switches. If the number of magnets and/or lead switches is increased, a problem of cost or space will also arise. However, when the magnetic direction sensor is used, such a concern does not arise.

The sampling interval may be changed according to a period of time and the predetermined conditions. For instance, it is conceived that the sampling interval is long during low-speed rotation and short during high-speed rotation.

Preferably, the magnet 5 is fixedly provided on the rotary disk 54b such that the same polarity faces the magnetic direction sensor 6 at all times.

The flow rate computing section included in the controller 7 determines a flow rate according to a signal from the magnetic direction sensor 6, and the thus-determined flow rate is displayed on the display section 3. Further, the controller 7 also includes a weighting coefficient computing section for computing a weighting coefficient, which will be described later. Although the flow rate computing section and the weighting coefficient computing section are not illustrated, they can be configured from an ordinary computing circuit.

Operation of the flow rate computing section and that of the weighting coefficient computing section, both sections being included in the controller 7, performed when a flow rate is determined according to the signal from the magnetic direction sensor 6 will be descried hereunder by reference to the drawings.

As mentioned above, the mechanism which entails conversion of reciprocal movement into circular movement encounters difficulty in realizing the circular movement as ideal constant-velocity circular movement. Accordingly, the moving velocity of the magnet varies from one arbitrary point to another arbitrary point along the orbit. It is difficult to say that mere detection of the signal obtained by the magnetic direction sensor 6 corresponds to detection of accurate moving velocity of the magnet at each point, and by extension, the value of an accurate flow rate.

Therefore, in the present embodiment, the weighting coefficient is set and imparted to each position according to a position on a path; namely, a position in the circumferential direction of the rotary member and to an angular velocity of the rotary member. A flow rate is assumed to be determined for each position by use of the weighting coefficient. Specifically, the following operations are performed.

(1) A time "t" required for one rotation of the rotary member 54 is measured at a plurality of reference points. In the embodiment shown in FIG. 17(a), the time "t" required for one rotation of the rotary member 54 is measured at eight points from A to H (which are set along the circumferential at intervals of 45°). The magnetic direction sensor 6 measures a time "t" from a time when the magnet 5 has first passed by the point A to a time when the magnet 5 has again passed by the point A. This metering operation is also performed at the other points.

(2) Next, the angular velocity ω is determined at an arbitrary point. The arbitrary point is not limited to the eight points from A to H. The point may be located between the points. The magnetic direction sensor 6 can detect the position of the magnet at all points along the circumference. To be precise, the position (direction) of the magnet at two points P1, P2, which are adjacent to each other along the circumference, is determined during a predetermined period of sampling time Δt (FIG. 17(a)). Angular velocity ω1 can be computed from the relationship between the change and the sampling time.

(3) A range is divided according to the angular velocity ω measured in (2) from a point, where a difference between the times "t" corresponding to the plurality of reference points determined in (1) falls within the range of a predetermined difference, to an arbitrary point along a predetermined circumference, thereby computing weighting coefficients "k" of the respective sub-divisions.

In relation to the above computation, when a flow rate value is computed from the angular velocity achieved at an arbitrary point, the following relationship stands.

$$Q = k \times V \times (\theta/360) \times 3600/t \quad \text{(Eq. 1)}$$
$$= k \times V \times 10 \times \omega$$

In the meantime, when the flow rate value is computed from the time required for one rotation of the rotary member 54, the following relationship stands.

$$Q = V \times 3600/t \quad \text{(Eq. 2)}$$

In the above equation, the symbols denote the following physical quantities. V liters of gas is supplied to a metering chamber by one rotation of the rotary member 54, and the thus-supplied gas is discharged from the metering chamber. Specifically, the V liters of gas passes through the meter.

V: a unit measured weight=the volume of a metering chamber (liter: L)

θ: angle (degrees: deg)

t: time (second: s)

Q: flow rate value (liter/hour: L/h)

ω: angular velocity (degree/s: deg/s)

k: weighting coefficient (constant)

In step (1), flow rate values Q ($Q_A$, $Q_B$, $Q_C$, $Q_D$, $Q_E$, $Q_F$, $Q_G$, $Q_H$), which are achieved at respective points from A to H by use of (Eq. 2), are computed. In relation to the points on the circumference including the points where a difference among the flow rate values falls within the range of a predetermined difference (e.g., two points $Q_A$, $Q_B$), no substantial variations are considered to exist in the angular velocity. A reference value Q' determined from the points (e.g., an average of $Q_A$, $Q_B$) is used and taken as Q in (Eq. 1). A weighting coefficient "k" is determined for each area corresponding to a point where ω has been measured, by use of ω acquired at an arbitrary point determined in step (2).

Figure 17:
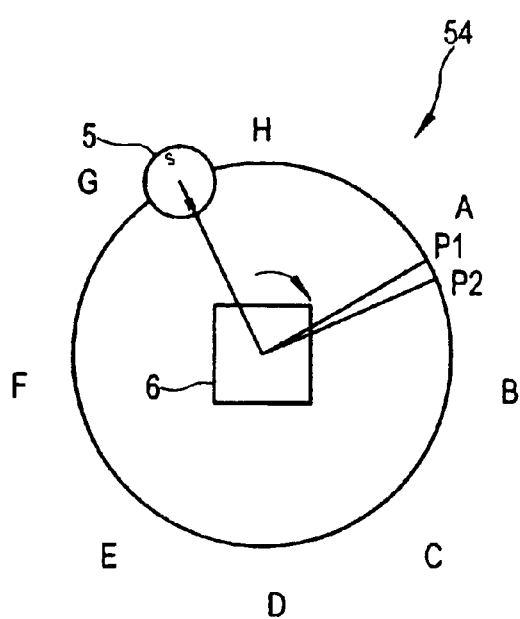
FIG. 17. A descriptive view of weighting of each of the sections in a rotational direction.
Figure 17:
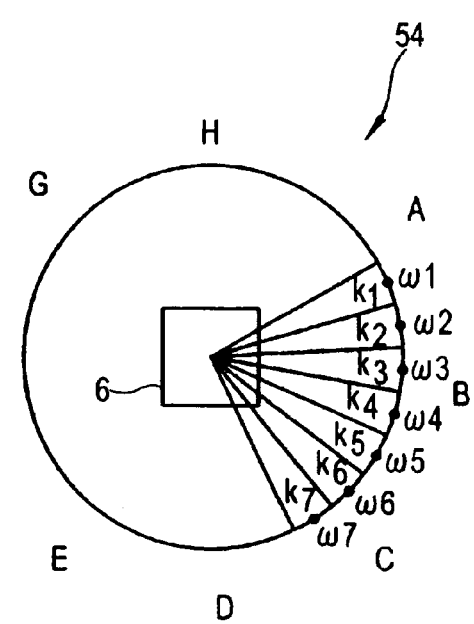

On the basis of Q' determined from the respective points, the weighting coefficient "k" is determined. As shown in FIG. 17(b), k2 to k7 corresponding to the other points ω2 to ω9 where the angular velocities are measured as well as k1 corresponding to ω1 determined between the points P1 and P2 are determined by the following equations.

$$Q'=k1 \times V \times 10 \times \omega 1$$
$$Q'=k2 \times V \times 10 \times \omega 2$$
$$Q'=k3 \times V \times 10 \times \omega 3$$
$$Q'=k4 \times V \times 10 \times \omega 4$$
$$Q'=k5 \times V \times 10 \times \omega 5$$
$$Q'=k6 \times V \times 10 \times \omega 6$$
$$Q'=k7 \times V \times 10 \times \omega 7 \quad \text{(Eq. 3)}$$

It is also considered that the weighting constant "k" becomes nonlinear depending on ω. Therefore, the respective weighting coefficient "k" is imparted in each of the case of a small amount of flow, the case of an intermediate amount of flow, and the case of a large amount of flow.

In the above descriptions, a structural boundary between the weighting coefficient computing section and the flow rate computing section is not univocal. For example, a circuit having both functions can be constituted by means of a single circuit. From the functional aspect, the weighting coefficient computing section detects variations in the rotation of the rotary member 54 from the detection signal output from the magnetic direction sensor 6, and computes an angular velocity ω of an arbitrary position along the circumferential direction of the rotary member 54 and a weighting coefficient corresponding to the angular velocity ω. The flow rate computing section detects the position of the magnet 5 from the detection signal output by the magnetic direction sensor 6, and computes the flow rate of a gas at an arbitrary position by reference to the position of the magnet 5 and the weighting coefficient.

Especially, the weighting coefficient computing section measures the time required for one rotation of the rotary member 54 at the plurality of reference points A to H in the rotational direction of the rotary member 54 by reference to the detection signal output from the magnetic direction sensor 6, and detects the angular velocity at the plurality of positions in the rotational direction of the rotary member 54. In the predetermined areas (the areas represented by k1 to k7 in FIG. 17(b)) in the circumferential direction of the rotary member 54, where the measured times fall within the range of a predetermined difference, the weighting coefficients (k1 to k7) achieved at the positions (ω1 to ω7), where the angular velocities have been detected, are computed by reference to the reference time determined from the times falling within the range of the predetermined difference and the angular velocity. The weighting coefficient "k" is computed in the same manner with regard to the other areas (D to H).

A flow rate achieved at a specific position in the circumferential direction is computed by use of the thus-obtained "k," and the flow rate achieved in a momentary direction is also grasped. Consequently, an accurate momentary flow rate can be monitored at all times, and an anomalous increase in flow rate can be addressed more quickly.

Fourth Embodiment

Computation performed by the flow rate computing section can also be set as follows.

(1) A time "t" required for one rotation of the rotary member 54 is measured at a plurality of reference points. As in the case of the embodiment shown in FIG. 17(a), the time "t" required for one rotation of the rotary member 54 is measured at eight points from A to H. The magnetic direction sensor 6 measures a period of time from when the magnet 5 has first passed by the point A until when the magnet 5 has again passed by the point A. This metering operation is also performed at the other points. As in the case of the first embodiment, the flow rate values Q ($Q_A$, $Q_B$, $Q_C$, $Q_D$, $Q_E$, $Q_F$, $Q_G$, $Q_H$), which are achieved at respective reference points are computed by (Eq. 2).

(2) The angular velocities ω ($\omega_A$, $\omega_B$, $\omega_C$, $\omega_D$, $\omega_E$, $\omega_F$, $\omega_{\omega H}$) achieved at respective reference points are detected by the magnetic direction sensor 6.

Figure 18:
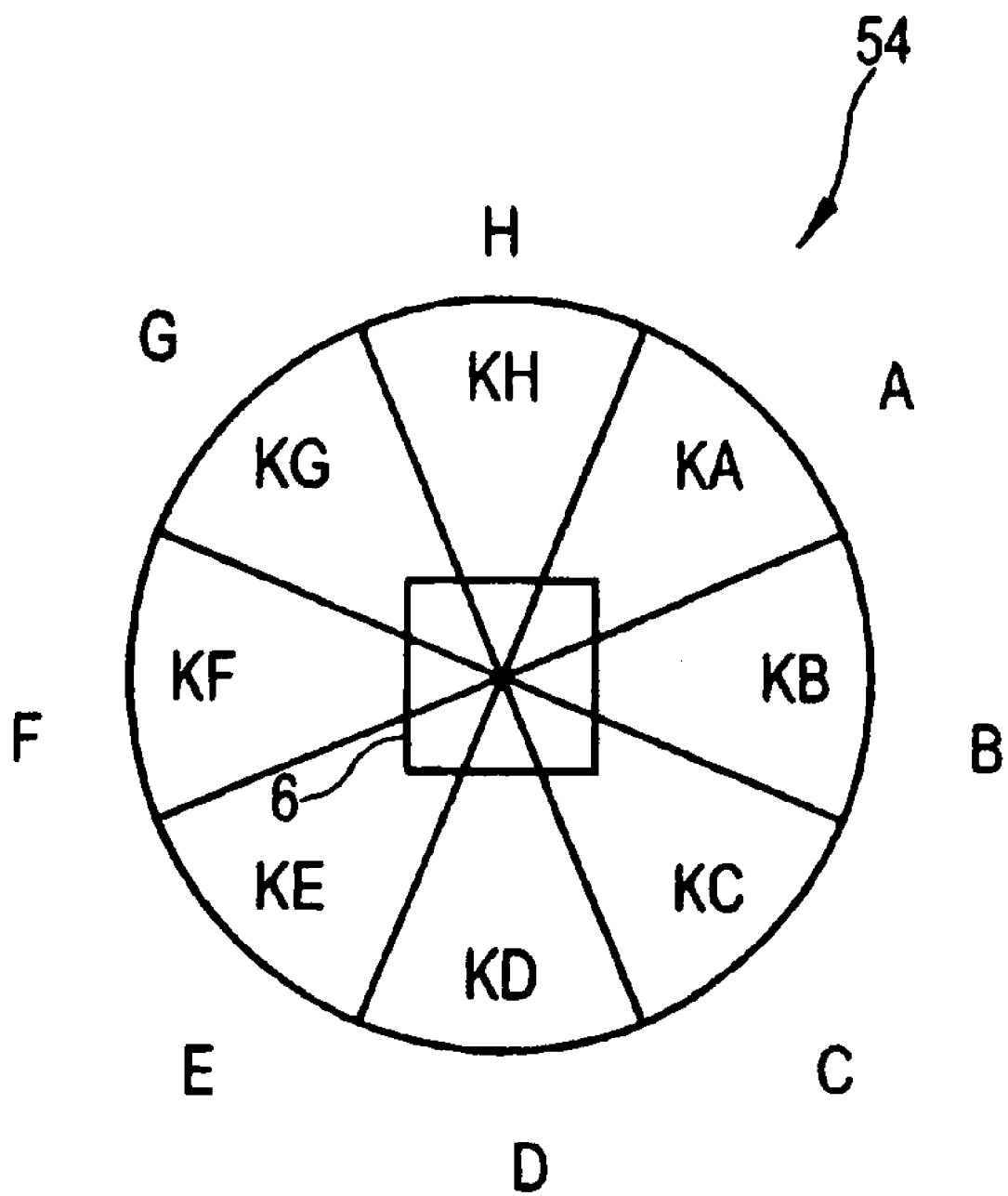
FIG. 18. A descriptive view of weighting of each of the sections in the rotational direction.

(3) The angular velocities ω detected in (2) are considered to be held within a predetermined range from each of the reference points. The weighting coefficient "k" employed in (1) is determined from the angular velocity ω achieved at each of the reference points included in the range and the flow rate value Q determined in (1). These operations are performed for each of the ranges. In the embodiment shown in FIG. 18, equivalent angular velocities are considered to be achieved at intermediate points between the respective reference points. Specifically, the flow rates are determined as follows.

$$Q_A = k_A \times V \times 10 \times \omega_A$$
$$Q_B = k_B \times V \times 10 \times \Omega_B$$
$$Q_C = k_C \times V \times 10 \times \omega_C$$
$$Q_D = k_D \times V \times 10 \times \omega_D$$
$$Q_E = k_E \times V \times 10 \times \omega_E$$
$$Q_F = k_F \times V \times 10 \times \omega_F$$
$$Q_G = k_G \times V \times 10 \times \omega_G$$
$$Q_H = k_H \times V \times 10 \times \omega_H \quad \text{(Eq. 4)}$$

As in the case of the third embodiment, a structural boundary between the weighting coefficient computing section and the flow rate computing section is not univocal. Particularly, the weighting coefficient computing section measures the time required for one rotation of the rotary member 54 at the plurality of reference points A to H in the rotational direction of the rotary member 54, by reference to the detection signal output from the magnetic direction sensor 6; and detects the angular velocities $\omega_A$ to $\omega_H$ at the reference points A to H of the rotary member 54. In connection with each of predetermined areas (the areas $k_A$ to $k_H$ in FIG. 18) from the respective reference points A to H in the circumferential direction of the rotary member 54, a weighting coefficient computed by reference to the time required for one rotation and the angular velocity, which correspond to the area, is imparted.

In the present embodiment, the amount of computation can be made smaller than that is required in the first embodiment. The burden imposed on the weighting coefficient computation section and that on the flow rate computation section can be diminished. Further, cost can also be curtailed. Moreover, the amount of consumed electric current can be lessened, and cost cutting can also be achieved by miniaturization of a battery.

Fifth Embodiment

Computation of the flow rate computing section can also be set as follows.

(1) A time "t" required for one rotation of the rotary member 54 is measured at a plurality of arbitrary points, as in the case of step (1) in the above embodiment.

(2) Likewise, the time required for one rotation is continuously measured at the same location. The flow rate value Q acquired at an arbitrary point is considered to be determined as V/t from the most-recent time "t" required for one rotation, thereby determining the flow rate value Q at each of the points. In this case, the weighting coefficient "k" is not determined. The flow rate value Q acquired during previous rotation is reset every time one rotation is performed, thereby determining the most-recent flow rate value Q.

In the present embodiment, there is no concept of a "weighting coefficient." Hence, the weighting coefficient computing section is not required, and the flow rate computing section performs the above computing operations.

Even in the present embodiment, the amount of computation can be reduced as compared with the third embodiment. The burden imposed on the flow rate computing section can be lessened. Further, cost cutting can also become feasible.

In the present embodiment, the points of metering are not arbitrary, and an infinite number of predetermined reference points may be determined while the metering time is taken as a reference. First, a plurality of reference points are determined at equal intervals and metering is performed. A time "t", which is acquired at the reference point A when the measured times have fallen in the range of a predetermined difference, is divided by an arbitrary value N. A position, which is distant from the reference point A by a time interval of t/N, is again registered as a reference for a plurality of values N. Through the above operations, the reference points are set without use of the weighting coefficient "k" as if one rotation were constant-velocity movement, and metering is performed. Thereby, a flow rate Q' achieved at an arbitrary time between the reference points can be determined with high accuracy even when reference is made to the flow rate Q achieved at the immediately-preceding reference point.

Sixth Embodiment

Figure 19:
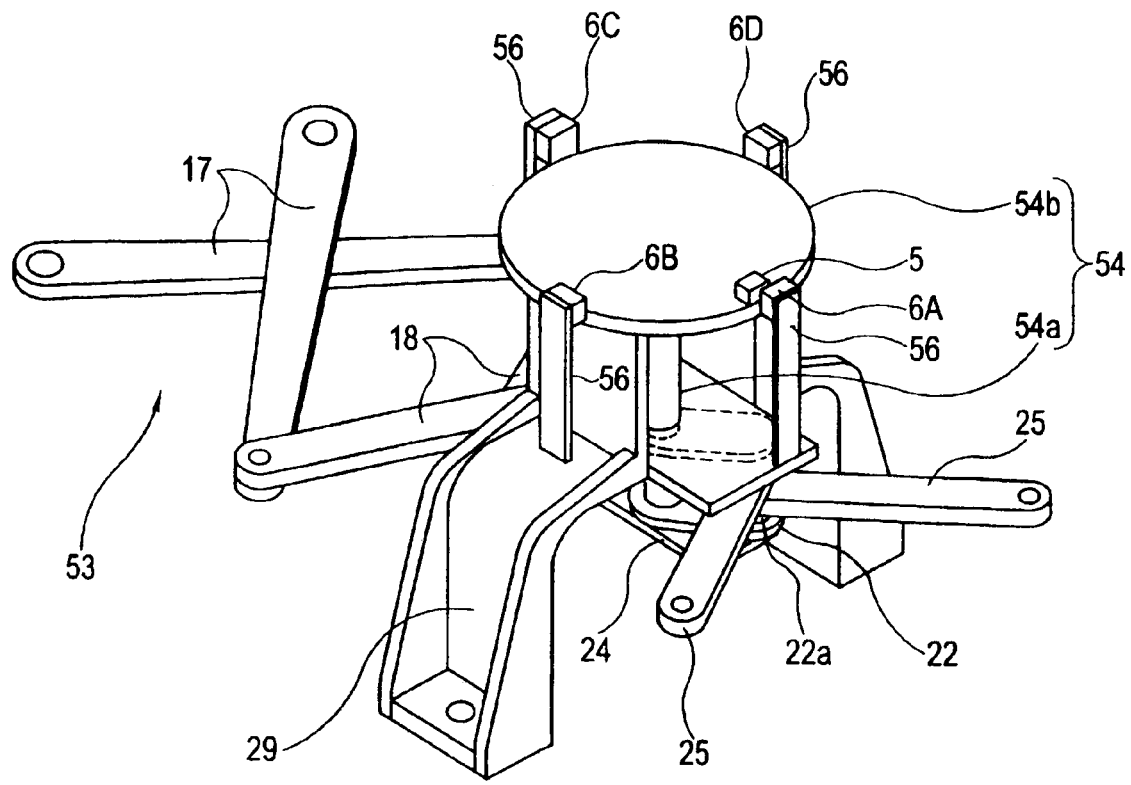
FIG. 19. An enlarged perspective view of a neighborhood of the rotary member of the membrane-type gas meter according to another embodiment.
Figure 20:
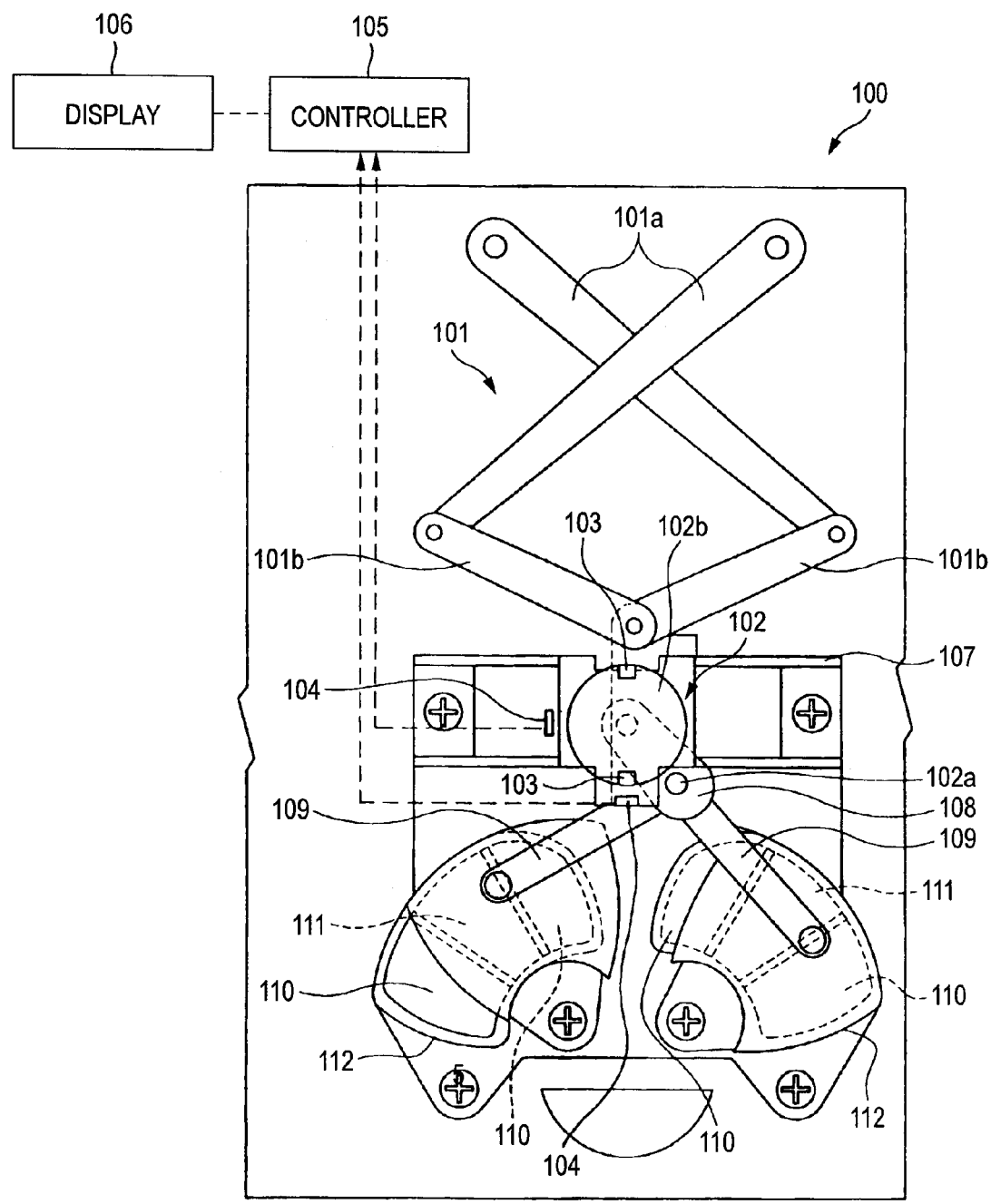
FIG. 20. A plan view of a characteristic section of a related-art membrane-type gas meter.

As shown in FIG. 19, in the present embodiment, four lead switches 6A to 6D are used without use of the magnetic direction sensor 6. The lead switches 6A to 6D are placed at equal intervals in the vicinity of the outer brim of the rotary disk 54b of the rotary member 54.

The lead switch is a compact electronic component which is used as a proximity sensor or for detecting opening and closing actions by combination of a permanent magnet. Two leads (magnetic material) are sealed in a glass tube with an inactive gas. When the magnet is made close to the leads, the two leads are magnetized to thus attract each other, whereby a contact point is closed. When the magnet is separated from the lead switch, the two leads are separated from each other. By application of this property, the lead switch is widely used as a proximity sensor for detection of rotation in the field of an automobile, OA equipment, medical equipment, compact electronic equipment, or the like.

In the present embodiment, the four lead switches 6A to 6D are provided as lead switches at positions which are separated from each other through 90° with regard to the rotational direction of the rotary member 54. Specifically, the lead switches 6A to 6D are fixedly supported by the upper ends of support posts 56 formed on the support mount 29; situated outside the outer brim of the rotary disk 54b of the rotary member 54; and positioned so as not to contact the outer brim.

In the embodiment, computation performed by the flow rate computing section is carried out as follows by use of computation described in connection with the third embodiment.

(1) As in the case of step (1) of the previous embodiment, the four lead switches measure the time "t" required for one rotation of the rotary member 54.

(2) Similarly, the respective lead switches continuously measure the time required for one rotation of the rotary member. The flow rate value Q achieved at an arbitrary point by the lead switches is considered to be V/t as computed from the most-recent time "t" required for one rotation, thereby determining the flow rate value Q in each point. In this case, the weighting coefficient "k" is not determined. Further, the flow rate value Q of the previous rotation is reset every time one rotation is performed, to thus determine the most-recent Q.

Even in the present embodiment, the point where the lead switch is to be placed may be determined by means of taking the measured time as a reference, as in the case of the third embodiment. At the outset, a plurality of reference points are determined at equal intervals, and the lead switches are placed at the respective reference points. Metering is then performed. The time "t", which is acquired at the reference point A where the times fall within the range of a predetermined difference, is divided by an arbitrary value N. A position, which is spaced from the reference point A by a time interval of t/N, is again registered as the reference for the plurality of values N, and the lead switches are positioned. Through the above operations, the reference points are set as if single rotation were constant-velocity movement, without use of the weighting constant "k," and metering is performed. A flow rate Q' achieved at an arbitrary time between the reference points can be determined with high accuracy even when reference is made to the flow rate Q achieved at the immediately-preceding reference point.

(Specific Example)

A specific example metering performed under the method described in connection with the third embodiment will be mentioned hereunder.

$Q_A$ (an angle of 0°)=30 L/h $Q_B$ (an angle of 45°)=30.5 L/h

Average Q'=30.25 L/h

Error of 0.5 L/h<1 L/h (within a predetermined range of 1 L/h)

V=0.6 L

Angular velocity ω between $Q_A$ and $Q_B$:

0 to 15°: ω=5 k=1.008

15 to 30°: ω=5.1 k=0.988

30 to 45°: ω=4.9 k=1.029

In the above embodiment, in the case of 0 to 15°: ω=20, k=1.008 is applied, and a gas is measured to flow at a flow rate of 120.96 L/h.

In the above embodiment, the rotary member 54 assumes a circular shape when viewed in plane. The shape of the rotary member 54 is not limited to a circle and may be essentially circular. In any case, the requirement is to be able to modify the circumferential speed of the rotary member 54 by use of the weighting coefficient "k" such that a correct momentary flow rate is reflected. Although the magnetic direction sensor 6 is placed on the rotational center axis of the rotary member 54, the sensor may be placed at the essential center of rotation. Placing the magnetic direction sensor in the center is not necessary. Accordingly, the distance between the magnetic direction sensor 6 and the magnet 5 does not need to be made equivalent over the rotational direction of the rotary member 54.

In the third to sixth embodiments, variations in the rotation of the rotary member are modified by use of a weighting coefficient or another method while the position and movement of the member to be detected are being observed in an analog fashion. Consequently, an accurate momentary flow rate of a fluid can be monitored at all times, and an anomalous increase in flow rate can also be addressed more quickly.

The flowmeter of the present invention is not limited to the membrane-type gas meter illustrated in connection with the embodiments, and can also be applied to various types of other gas meters.

The flowmeter of the present invention is not limited to the gas meter and can be used as an apparatus for metering the flow rate of various types of other fluids, such as a gas, a liquid, and the like. Thus, no limitations are imposed on the application of the flowmeter.

In the flowmeter using a single magnet of the above embodiments, a plurality of magnets may be used. In this case, an increased number of signals are output from the magnetic direction sensor or more than one lead switch is used.

Although the above embodiments use a combination of the magnet and the magnetic direction sensor, there may also be employed a direction sensor where an arbitrary member to be detected is arranged and the direction of the member can be detected.

The above descriptions have illustrated an example membrane-type gas meter, wherein a valve section is formed from two pivotal valves for controlling supply and discharge of a gas to and from the two metering chambers through pivotal operation. However, the present invention can also be applied to a membrane-type gas meter, where a valve section is formed from a rotary valve for controlling supply and discharge of a gas to and from four metering chambers by means of rotational operation.

Although the above embodiments have illustrated the case where the present invention is applied to the membrane-type gas meter having the four metering chambers and the pair of membrane sections, the present invention can also be applied to a membrane-type gas meter having two metering chambers and a single membrane section.

Although various embodiments of the present invention have been described thus far, the present invention is not limited to the items described in the embodiments. Alternations or applications, which can be conceived by persons skilled in the art on the basis of the scope of the claims, descriptions of the specification, and known techniques, are expected by the present invention; and fall within the scope where the protection of the invention is sought.

The present invention claims priority to Japanese Patent Application No. 2004-283472; No. 2004-283601; and No. 2004-283602, all of which were filed on Sep. 29, 2004 and are incorporated herein by reference in their entireties.

INDUSTRIAL APPLICABILITY

The flowmeter of the present invention uses a member to be detected and a direction sensor, to thus determine the relative position between them. Thus, a flow rate of a fluid is measured. Consequently, metering resolution is enhanced, and accurate metering can be carried out.

The invention claimed is:

1. A flowmeter comprising:

a main body;

a membrane section which is fixed to the main body and defines a metering chamber used for housing and discharging a fluid;

a rotation section which performs rotational movement in synchronism with reciprocal movement of the membrane section;

a member to be detected which is placed on one of the main body and the rotation section;

a direction sensor which is placed on another one of the main body and the rotation section and detects location of the member to be detected and movement thereof caused in association with rotational movement of the rotation section; and a flow rate computing section which detects the position of the member to be detected by means of a detection signal output from the direction sensor and which computes a flow rate of the fluid.

2. The flowmeter according to claim 1, wherein the member to be detected is placed on the rotation section, and wherein the direction sensor is placed at the center of rotational movement of the member to be detected.

3. The flowmeter according to claim 1, wherein the member to be detected is a magnet, and wherein the direction sensor is a magnetic direction sensor.

4. The flowmeter according to claim 3, wherein the magnet rotates while directing a single pole thereof toward the magnetic direction sensor at all times.

5. A flowmeter comprising:

a main body;

a membrane section which is fixed to the main body and defines a metering chamber used for housing and discharging a fluid;

a movement conversion section for converting reciprocal movement of the membrane section into rotational movement;

a member to be detected which is fixed to one of the main body and a mechanism section formed from the membrane section and the movement conversion section;

a direction sensor which is fixed to another one of the main body and the mechanism section and which detects a position relative to the member to be detected; and a flow rate computing section which detects the position of the member to be detected by means of a detection signal output from the direction sensor and which computes a flow rate of the fluid.

6. The flowmeter according to claim 5, wherein one of the member to be detected and the direction sensor is fixed to the membrane section.

7. The flowmeter according to claim 6, wherein the member to be detected is a magnet fixed to the membrane section, wherein the direction sensor is a magnet fixed to the membrane section, and wherein the direction sensor is a magnetic direction sensor.

8. A flowmeter comprising:
a main body;
a membrane section which is fixed to the main body and defines a metering chamber used for housing and discharging a fluid;
a rotary member which performs rotational movement in synchronism with reciprocal movement of the membrane section;
a member to be detected which is placed on the rotary member;
a direction sensor which detects location of the member to be detected and movement thereof caused in association with rotational movement of the rotary member;
a weighting coefficient computing section which detects variations in rotation of the rotary member from a detection signal output from the direction sensor and which computes an angular velocity achieved at an arbitrary position along a circumferential direction of the rotary member and a weighting coefficient in response to the angular velocity; and
a flow rate computing section which detects the position of the member to be detected by means of a detection signal output from the direction sensor and which computes a flow rate of the fluid achieved at the arbitrary position by reference to the position of the member to be detected and the weighting coefficient.

9. The flowmeter according to claim 8, wherein the weighting coefficient computing section measures a time required for one rotation of the rotary member at a plurality of reference points along a rotational direction of the rotary member by reference to the detection signal output from the direction sensor;
detects an angular velocity at the respective positions along the rotational direction of the rotary member; and
computes, in a predetermined area along the rotational direction of the rotary member where the measured times fall within a range of the predetermined difference, weighting coefficients for the positions, where the angular velocities have been detected, by reference to a reference time determined from the times falling within the range of the predetermined difference as well as to the angular velocities.

10. The flowmeter according to claim 8,
wherein the weighting coefficient computing section:
measures a time required for one rotation of the rotary member at a plurality of reference points in a rotational direction of the rotary member by reference to a detection signal output from the direction sensor;
detects an angular velocity at the respective reference points of the rotary member; and
imparts a weighting coefficient computed by reference to the time and the angular velocity, in a predetermined area along the rotational direction of the rotary member from the respective reference points.

11. The flowmeter according to claim 8, wherein the direction sensor is placed substantially at a center rotation axis of the rotary member.

12. The flowmeter according to claim 11, wherein the member to be detected is placed at a position along an outer brim of the rotary member, and a distance between the direction sensor and the member to be detected is essentially equal over the rotational direction of the rotary member.

13. The flowmeter according to claim 8,
wherein the member to be detected is a magnet, and
wherein the direction sensor is a magnetic direction sensor.

14. A flowmeter comprising:
a main body;
a membrane section which is fixed to the main body and defines a metering chamber used for housing and discharging a fluid;
a rotary member which performs rotational movement in synchronism with reciprocal movement of the membrane section;
a member to be detected which is placed on the rotary member;
a direction sensor which detects location of the member to be detected and movement thereof caused in association with rotational movement of the rotary member; and
a flow rate computing section which detects from a detection signal output from the direction sensor variations in rotation of the rotary member and the position of the member to be detected and which computes a flow rate of the fluid,
wherein the flow rate computing section measures a time required for one rotation of the rotary member at a plurality of positions in the rotational direction of the rotary member and computes a flow rate at each of the positions on the basis of the most-recently measured time.

15. The flowmeter according to claim 14, wherein the direction sensor is placed essentially at the center rotation axis of the rotary member.

16. The flowmeter according to claim 15, wherein the member to be detected is placed at a position along an outer brim of the rotary member, and a distance between the direction sensor and the member to be detected is essentially equal over the rotational direction of the rotary member.

17. The flowmeter according to claim 14,
wherein the member to be detected is a magnet, and
wherein the direction sensor is a magnetic direction sensor.

18. A flowmeter comprising:
a main body;
a membrane section which is fixed to the main body and defines a metering chamber used for housing and discharging a fluid;
a rotary member which performs rotational movement in synchronism with reciprocal movement of the membrane section;
a magnet placed on the rotary member;
a plurality of lead switches for detecting movement of the magnet associated with rotational movement of the rotary member; and
a flow rate computing section which detects variations in rotation of the rotary member and the position of the magnet by means of a detection signal output from the plurality of lead switches and which computes a flow rate of the fluid,
wherein the flow rate computing section measures a time required for one rotation of the rotary member at positions of the plurality of lead switches and computes a flow rate at each of the positions on the basis of the most-recently measured time.

19. The flowmeter according to claim 18, wherein the magnet is placed at a position along an outer brim of the rotary member, and the plurality of lead switches are placed in the vicinity of the outer brim.

* * * * *

UNITED STATES PATENT AND TRADEMARK OFFICE
CERTIFICATE OF CORRECTION

PATENT NO. : 7,340,950 B2
APPLICATION NO. : 11/574896
DATED : March 11, 2008
INVENTOR(S) : Yasuo Koba et al.

It is certified that error appears in the above-identified patent and that said Letters Patent is hereby corrected as shown below:

In column 18, line 30, please delete " $Q_B = k_B \times V \times 10 \times \Omega_B$ "

and insert therefor -- $Q_B = k_B \times V \times 10 \times \omega_B$ --

Signed and Sealed this

Nineteenth Day of August, 2008

JON W. DUDAS
*Director of the United States Patent and Trademark Office*